United States Patent [19]

Kakimoto et al.

[11] Patent Number: 5,455,498
[45] Date of Patent: Oct. 3, 1995

[54] ANGLE OF ROTATION DETECTOR

[75] Inventors: Tatsumi Kakimoto, Yokohama; Takeshi Kubo, Kyoto; Kuniyoshi Takahashi, Osaka; Akiyoshi Fujisaki, Kyoto; Teruya Nishina, Kameoka, all of Japan

[73] Assignee: Omron Corporation, Kyoto, Japan

[21] Appl. No.: 697,335

[22] Filed: May 9, 1991

[30] Foreign Application Priority Data

| May 9, 1990 | [JP] | Japan | 2-119101 |
| May 9, 1990 | [JP] | Japan | 2-119102 |
| May 10, 1990 | [JP] | Japan | 2-120504 |
| May 14, 1990 | [JP] | Japan | 2-123590 |

[51] Int. Cl.$^6$ ............................................. G05B 19/31
[52] U.S. Cl. ........................ 318/605; 318/661; 341/116
[58] Field of Search .............................. 318/369, 600, 318/601, 604–605, 608, 638, 652–653, 656, 661; 341/111–117

[56] References Cited

U.S. PATENT DOCUMENTS

| H104 | 8/1986 | Hung et al. ........................ 340/347.54 |
| 3,671,728 | 6/1972 | Day et al. .......................... 318/605 X |
| 4,095,159 | 6/1978 | Tirelli ................................. 318/605 |
| 4,352,050 | 7/1982 | Sakano ............................... 318/661 |
| 4,384,242 | 5/1983 | Ono .................................... 318/721 |
| 4,484,129 | 11/1984 | Ono .................................... 318/807 |
| 4,626,754 | 12/1986 | Habermann et al. ................ 312/460 |
| 4,791,575 | 12/1988 | Watts, Jr. et al. ................. 364/474.36 |
| 4,795,954 | 1/1989 | Sakurai et al. ..................... 318/605 X |
| 4,962,331 | 10/1990 | Smith ................................. 310/261 |
| 5,189,353 | 2/1993 | Ezuka ................................ 318/605 |

FOREIGN PATENT DOCUMENTS

| 0137730 | 4/1985 | European Pat. Off. . |
| 0285878 | 10/1988 | European Pat. Off. . |
| 2647205 | 5/1989 | France . |

*Primary Examiner*—David S. Martin
*Attorney, Agent, or Firm*—Foley & Lardner

[57] ABSTRACT

An angle of rotation detector has a drive unit which supplies 90 degree phase shifted signals to a pair of stator coils and measures an analog output from a rotor coil in a resolver. A calculating device calculates the rotational angle of the resolver using the output of an analog to digital converter receiving the analog output of the rotor. In one embodiment, the calculating device performs a Fourier transform to compute the phase of a fixed frequency component contained in the output of the rotor coil. In another embodiment, the drive unit supplies signals wherein $f(T/2+t)=-f(t)$ and the calculating device performs a Fourier transform using data from successive half periods of the drive waveform. In another embodiment, the output of the rotor is sampled at ¼ period of an excitation signal from the drive unit and the calculating device determines the phase difference between the excitation signal and the rotor output. In still another embodiment, the calculating device compares the outputs at two or more points having a fixed time relationship and compares the results to stored reference data to arrive at the angle of rotation.

8 Claims, 18 Drawing Sheets

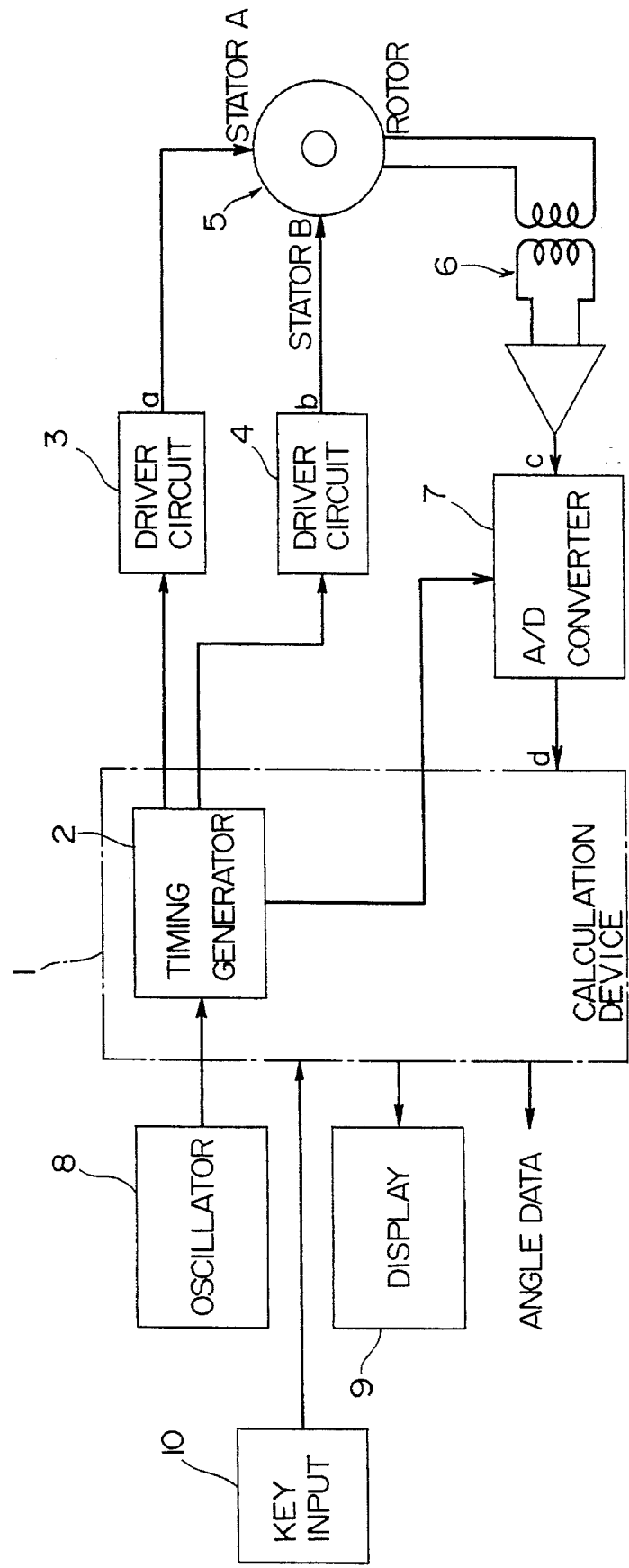

ANGLE OF ROTATION DETECTOR

BACKGROUND OF THE INVENTION

1. Field of The Invention

This invention relates to an angle of rotation detector which detects an angle of rotation using a resolver with one rotor and two stators.

2. Related Art

Heretofore, resolvers used to detect an angle of rotation were equipped with two stators, shown as 13 and 14 in FIG. 5. Two sine waves, phaseshifted relative to each other at an electrical angle of 90°, as shown in FIG. 6, are supplied to stators 13 and 14. This causes an excitation current to flow. The phase difference Θ between the output induced in a single rotor 15 and the excitation signal is obtained. This phase angle Θ is considered to be the angle of rotation. A conventional device for detecting angle of rotation using sine wave excitation is shown in FIG. 7. This device consists of: oscillator 21; dividing circuit 22 to accept pulses from oscillator 21 and divide them; circuit 23, which generates a signal to start the timing; sine wave generator circuit 24 and cosine generator circuit 25, which generate, respectively, a sine wave and a cosine wave synchronously with the signal from circuit 23; driver circuits 26 and 27; resolver 28; output circuit 29, which derives the rotor output of resolver 28; low pass filter 30, which eliminates harmonics components from the output; comparator 31, which detects the zero-crossing point; counter 32, which counts the pulse signals from divider circuit 22 from the time the start signal is received until the detection of the zero-crossing point causes the stop signal to be input; and CPU 33.

The conventional device just described to detect angle of rotation employs a sinusoidal excitation signal. It thus requires both a circuit to generate a sine wave and a circuit to generate a cosine wave. However, a circuit which can generate two such phase-shifted sine waves with good accuracy requires a large number of components, resulting in a relatively expensive device.

Employing an easier to generate non-sinusoidal excitation current source producing a non-sinusoidal wave, such as a rectangular wave, results in a large measurement error due to the effect of harmonics, which are contained within the rectangular wave. A low pass filter is generally used to eliminate such errors. However, cutting the tertiary harmonics sufficiently (by a voltage ratio of 40 dB), while allowing the basic or fundamental wave to pass, requires a multi-stage active filter or LC filter having a steep cutoff characteristic to effectively to break the circuit. This complicates the design. Temperature dependency considerations of the phase shift at the frequency of the fundamental wave necessitates a design which reduces the measurement accuracy of the angle (which is perhaps 0.5°) within the applicable range of temperature (perhaps 0° C. to 50° C.). Thus, the filter must use elements whose response to temperature variations is extremely small, driving up the cost of the device.

SUMMARY OF THE INVENTION

In view of the above limitations of conventional angle of rotation detectors, an object of the present invention is to provide a rotational angle detector which uses a non-sinusoidal drive but does not employ a costly filter.

It is a further object of the invention to reduce or eliminate errors resulting from harmonic signal components.

It is a still further object of the invention to achieve a high degree of accuracy at a low cost.

The rotational angle detector of the invention detects angle of rotation using a resolver with one rotor or rotor coil and two stators or stator coils. It is equipped with a drive unit which supplies excitation signals phase-shifted by 90° from each other to the two stators. The rotational angle detector is further equipped with means to convert the output of the rotor from an analog to a digital signal and means to calculate the rotational angle of the resolver. The calculation device accepts the A/D signal and, by means of a Fourier transform computes the phase of a fixed or constant frequency component contained in the output of the rotor. From the fundamental frequency component of the transfer function between the excitation wave and the rotor output, which contains high frequency components, in particular, the harmonic components, the phase shift, which is the angle of rotation can be obtained.

In another embodiment, the drive circuit is configured to generate excitation signal waveforms such that f(T/2+t)=−f(t), where t is time and T is period. The device which performs the calculation accepts the signal from the A/D conversion device and performs a Fourier transform using data from alternate half-cycles of the drive waveform. In this way it computes the phase of the fixed frequency component contained in the rotor output waveform, thereby calculating the rotational angle of the resolver.

In another embodiment, the rotation detector can also have a means e.g., 6a to sample the analog output of the rotor coil at each ¼ period of the excitation signal and a means to calculate the rotational angle of the resolver by determining the phase difference between the excitation signal and the output of the A/D conversion device. The angle of rotation detector uses the calculation device to calculate the angle of rotation by means of straight line interpolation based on two output samples before and after the zero crossing of the output from the A/D conversion device.

The angle of rotation detector can also use the calculation device to calculate the angle of rotation by means of determining the quotient of the two data points sampled successively and then calculating the inverse tangent of this quotient. Using still another approach, the angle of rotation detector employs the calculation device, which includes a detector, to judge whether the outputs of the aforementioned A/D conversion device are above or below a specified value within the amplitude range for the rotor output, in which of the four quadrants of the cycle the rotor outputs lie. The detector also includes a means to determine the rotational angle of the resolver by calculating the inverse of the sine from the quadrant of the rotor output and the sampled data point.

In another embodiment, the rotation angle detector includes means to digitize the output of the rotor, which samples the output waveform at as few as two points which differ from each other but have a fixed time relationship with respect to the drive waveform, and outputs the data. The angle of rotation detector further includes means to store a previously measured relationship between the rotor output and its angle of rotation and a means to compare the output of the A/D conversion device with the reference data stored in the storage unit in order to determine the resolver's angle of rotation. Alternatively, the angle of rotation detector can include means to store as constants values which have been previously input for the amplitude and phase of the harmonic components of the excitation wave contained in the aforementioned rotor output and a means to calculate an inverse trigonometric function using the output of the A/D conversion device and the constants in order to determine the rotational angle of the resolver.

The angle of rotation detector of the invention obviates the necessity of an expensive sine wave generator circuit (with a D/A converter and so on) such as was required by previous angle of rotation detectors. It also eliminates the need for an expensive low pass filter to remove harmonics. Because a calculation device built into an A/D converter is easy to obtain, this device is easier to build than its predecessors. Further, in the case where the angle calculation performed in the calculation device is completed during each half-cycle of the drive waveform, processing time is made available so that operations other than angle detection (data transmission, data display, comparison of data with a reference file, etc.) can be performed by the calculation device. This yields a high-capability angle of rotation detector. Additionally, the device has a low cost, the design can be simplified, and the angle of rotation can be detected with great accuracy.

BRIEF DESCRIPTION OF THE DRAWINGS

The above objects of the invention are met by the invention described herein with particular reference to the drawings in which:

FIGS. 8a and 8b are diagrams illustrating operations performed by a second embodiment of the invention;

DETAILED DESCRIPTION OF THE PREFERRED EMBODIMENTS

Figure 1:
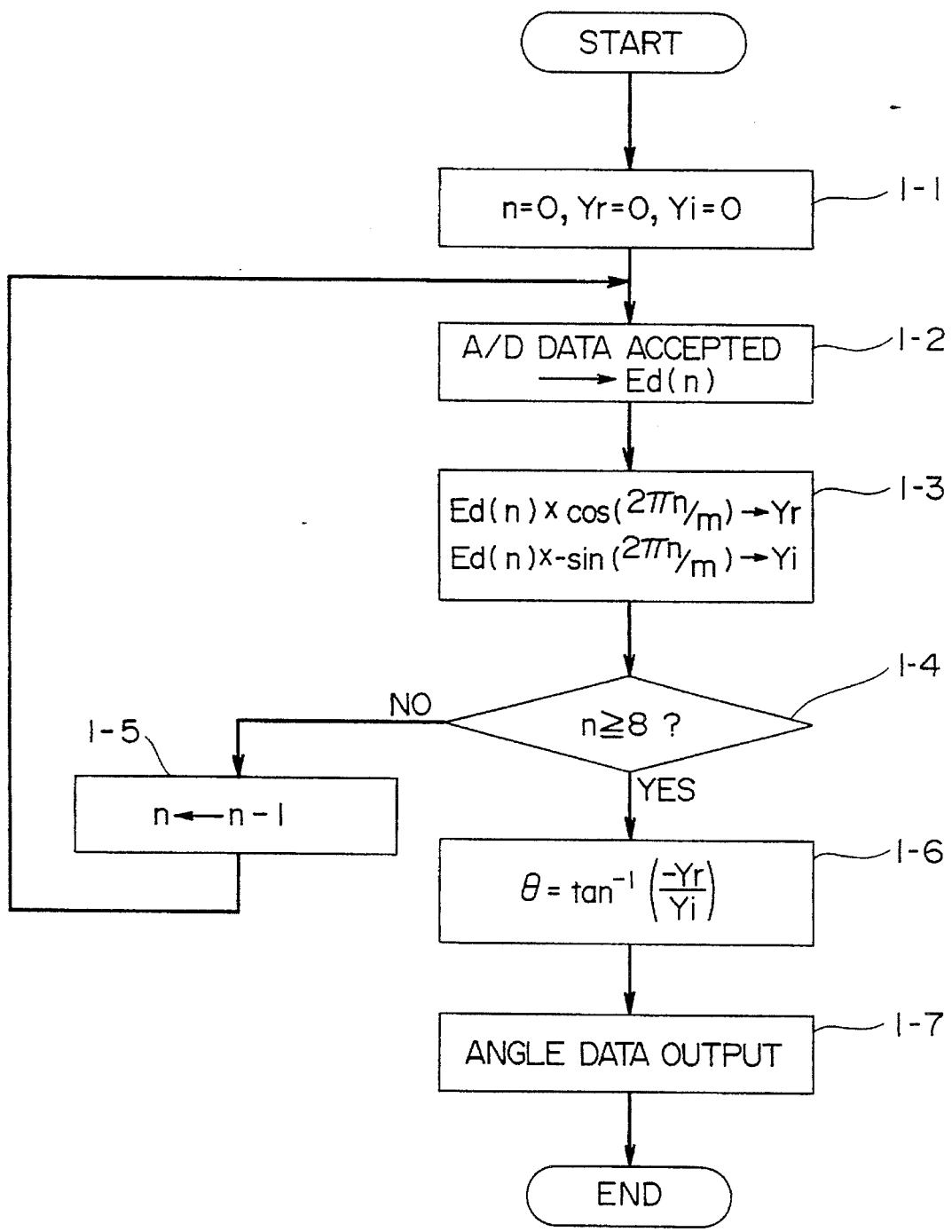
FIG. 1 is a flowchart illustrating the operation of a first embodiment of an angle of rotation detector according to the invention.

The Fourier transform is the method generally used to extract specified frequency components of a periodic function. This transform allows us to consider a function g (t) of time t to be a function of frequency f, in accordance with the calculation given below.

$$G(f) = \int_0^\tau g(t) e^{-j\omega t} dt (\omega = 2\pi \times f)$$

By using this transform, we can obtain the fundamental frequency component of the transfer function between the excitation wave and the rotor output, which contains harmonic components. We can thus obtain the phase shift, which, in other words, is the angle of rotation. The rotational angle detector of this invention employs just such a method.

We shall next discuss a concrete example of this calculation.

If u (t) is the excitation wave and y (t) is the rotor output, a Fourier transform performed on u (t) and y (t) will yield the fundamental frequency component f of the excitation waveform.

$$u(f) = \int_0^T u(t) e^{-j\omega t} dt = \int_0^T u(t)\{\cos\omega t - j\sin\omega t\} dt$$

$$y(f) = \int_0^T y(t) e^{-j\omega t} dt = \int_0^T y(t)\{\cos\omega t - j\sin\omega t\} dt$$

$$u(f) = u_1(f) + ju_2(f)$$
$$y(f) = y_1(f) + yj_2(f)$$

Thus the transfer function can be expressed as follows.

$$G(f) = G_1(f) + jG_2(f) = \frac{y(f)}{u(f)} = \frac{y_1(f) + jy_2(f)}{u_1(f) + ju_2(f)} =$$

$$\frac{y_1(f) \cdot u_1(f) + y_2(f) \cdot u_2(f)}{u_1^2(f) + u_2^2(f)} + \frac{j\{y_2(f) \cdot u_1(f) - y_1(f) \cdot u_2(f)\}}{u_1^2(f) + u_2^2(f)}$$

The phase shift 8 is expressed as $$\Theta = \tan^{-1} \frac{G_2(f)}{G_1(f)} = \tan^{-1} \frac{y_2(f) \cdot u_1(f) - y_1(f) \cdot u_2(f)}{y_1(f) \cdot u_1(f) + y_2(f) \cdot u_2(f)} \quad (1)$$

Thus by solving Equation (1) we obtain the angle of rotation Θ

FIGS. 2a, 2b, 8a and 8b are block diagrams illustrating sample rotational angle detectors according to a first embodiment (FIGS. 2a and 2b) and a second embodiment (FIGS. 8a and 8b), respectively. With reference to these diagrams, signals of rectangular waveform, phase-shifted by 90° relative to each other, are output by timing generator 2 in calculation device 1, which consists of a CPU or some similar device. These signal, e.g., signals a and b, are supplied to stators A and B in resolver 5 by way of driver circuits 3 and 4 respectively. The signals (a and b) which are supplied to stators A and B are shown in FIG. 3. The induced signal c, which originated in the rotor of resolver 5 and is output by way of output circuit 6 is sampled at specified sampling times, for example, in one embodiment, each ¼ period in A/D converter 7. The induced signal can also be sampled by a separate sampling device, as would be known to those of ordinary skill. In the second embodiment, the induced signal can be sampled at each ⅛ period in A/D converter 7. Signal c is converted to digital signal d (See FIG. 2) and supplied to calculation device 1, where it serves as the basis for the calculation of angle $\Theta$.

Figure 8A:
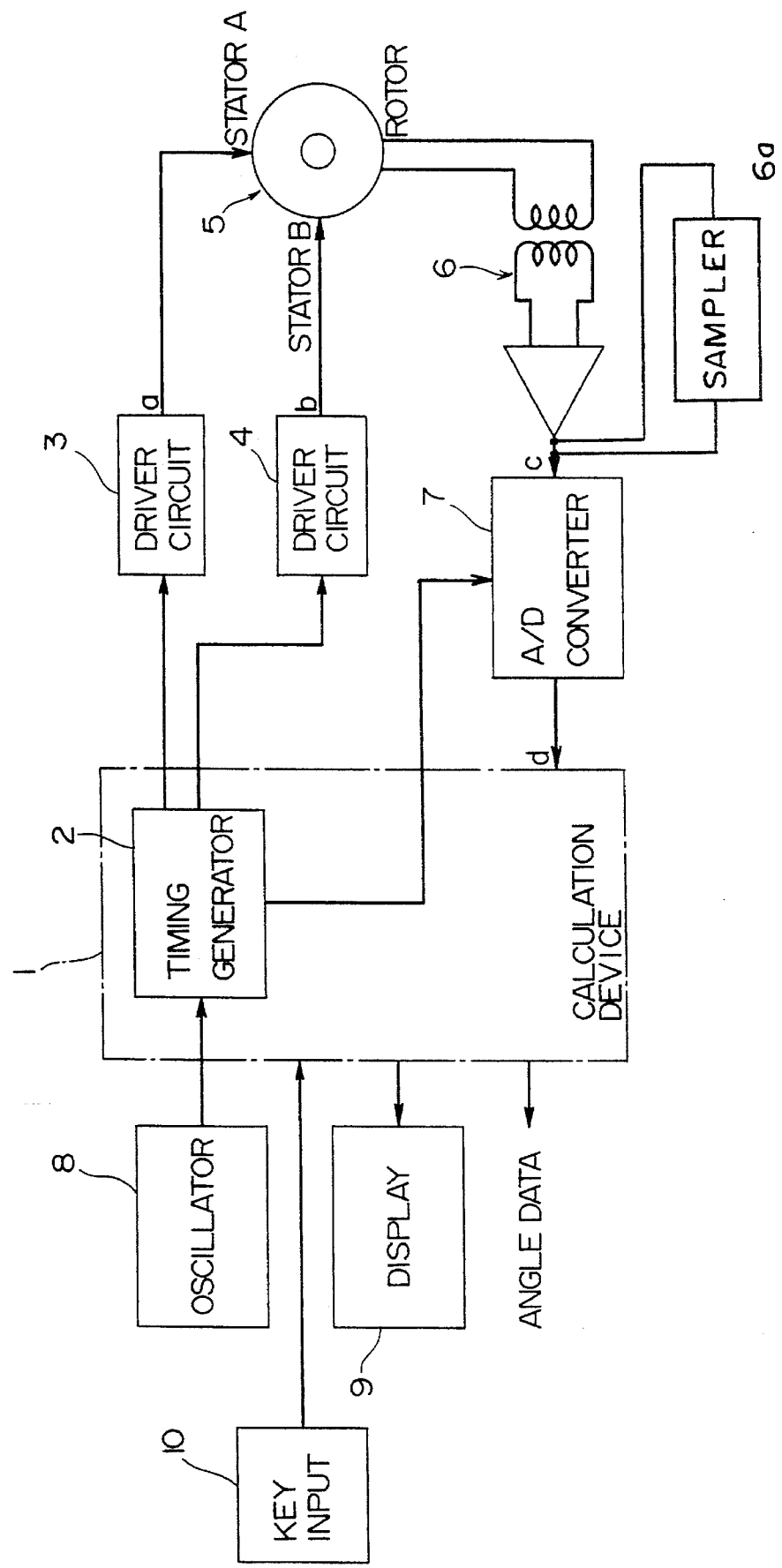
Figure 9:
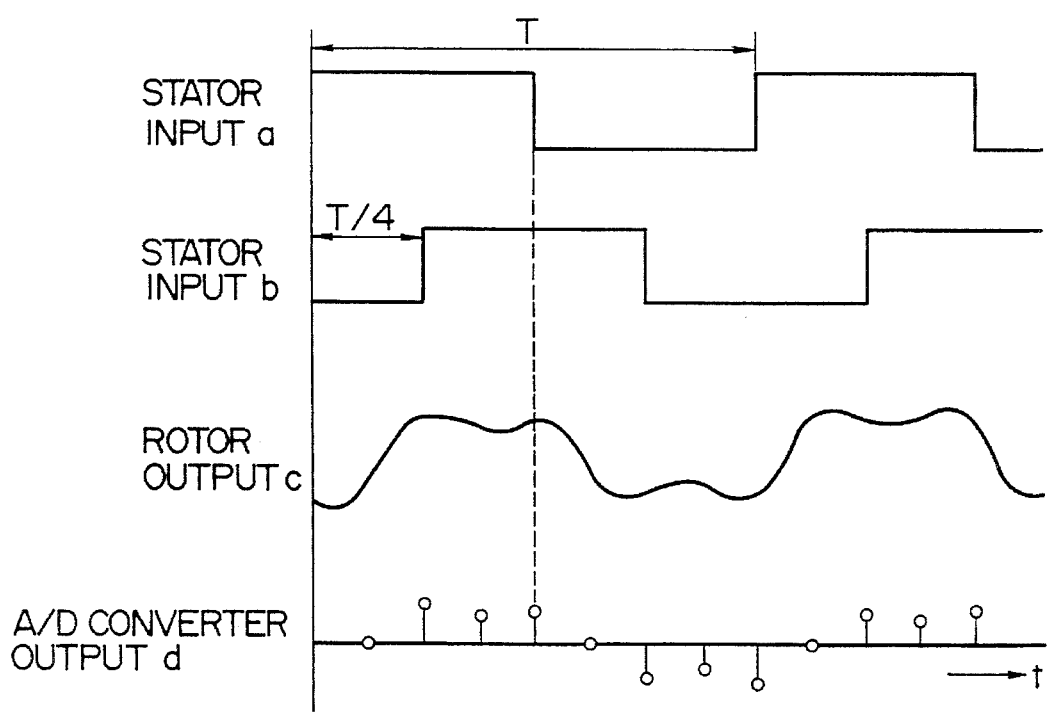
FIG. 9 shows waveforms illustrating operation of the second embodiment.

Also according to the second embodiment, the angle of the rotor can be obtained by determining the phase difference between the excitation waveform and that of the rotor output. Thus, the angle of the rotor can be discovered by solving Equation (1) given above. FIGS. 8a and 8b shows the relationship between frequency and phase differences for the fundamental and higher frequencies.

The excitation waveform u(t) is symmetric about the time axis at t=T/4{u(t)=u(T/2−t)}. If we select the symmetric waveform {u(t)=−u(t+T/2)} corresponding to the point T/2, (generally, rectangular, triangular, and trapezoidal waveforms, which are easy to generate, will fulfill this condition), then with regard to the definition $$u_1(f) = \int_0^T u(t) \cdot \cos\omega t \cdot dt$$

it can be said that $$\cos\omega\left(\frac{T}{2} - t\right) = -\cos\omega t$$

and $$\cos\omega\left(t + \frac{T}{2}\right) = -\cos\omega t$$

It follows, then, that $$u_1(f) = \int_0^T u(t) \cdot \cos\omega t \cdot dt = \int_0^{\frac{T}{2}} u(t) \cdot \cos\omega t \cdot dt +$$

$$\int_{\frac{T}{2}}^{T} u(t) \cdot \cos\omega t \cdot dt = \int_0^{\frac{T}{2}} u(t) \cdot \cos\omega t \cdot dt +$$

$$\int_0^{\frac{T}{2}} u(t) \cdot \cos\omega t \cdot dt = 2 \int_0^{\frac{T}{2}} u(t) \cdot \cos\omega t \cdot dt =$$

-continued $$2\left\{ \int_0^{\frac{T}{4}} u(t) \cdot \cos\omega t \cdot dt + \int_{\frac{T}{4}}^{\frac{T}{2}} u(t) \cdot \cos\omega t \cdot dt \right\} = 0$$

If we simplify Equation (1), we can obtain $$\Theta = \tan^{-1} \frac{-y_1(f)}{y_2(f)} \quad (2)$$

The rotor output including the harmonics components is expressed as $$E = A_1\sin(\omega t + \Theta) +$$
$$A_3\sin(3\omega t + \Theta + \phi_3) + A_5\sin(5\omega t + \Theta + \phi_5) + \ldots + N$$

where $\Theta$ is the angle of rotation; $\phi_3$, $\phi_5$, ... are the phase differences for the higher frequencies relative to the fundamental waveform when $\Theta=0$; and N is the noise component due to even-order harmonic components and so forth. Thus if the signal is digitized after sampling (It is sampled at periods of T/m), we get $$Ed(n) =$$

$$A_1\sin\left(n \cdot \frac{2\pi}{m} + \Theta\right) + A_3\sin\left(n \cdot \frac{6\pi}{m} - \Theta + \phi_3\right) +$$

$$A_5\sin\left(n \cdot \frac{10\pi}{m} - \Theta + \phi_5\right) + \ldots + N(n)$$

If we perform a Fourier transform on these data, the real part of the fundamental frequency component is $$Y_r = \sum_{n=0}^{m-1} Ed(n) \cdot \cos(2\pi n/m)$$

and the imaginary part is $$Y_i = \sum_{n=0}^{m-1} Ed(n) \cdot -\sin(2\pi n/m)$$

It thus becomes helpful to solve the following equation.

$$\Theta = \tan^{-1} \left\{ \frac{-\sum_{n=0}^{m-1} Ed(n) \cdot \cos(2\pi n/m)}{\sum_{n=0}^{M-1} Ed(n) \cdot -\sin(2\pi n/m)} \right\}$$

Figure 4:
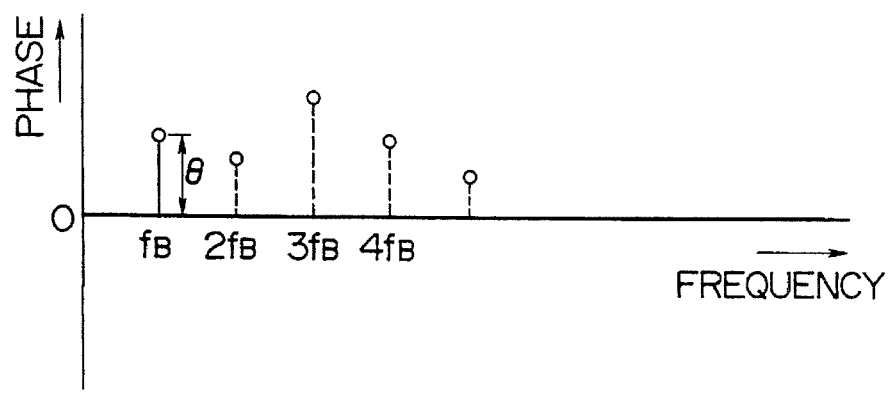
FIG. 4 illustrates the relationship between frequency and phase differences for the fundamental frequency and higher frequencies.
Figure 5:
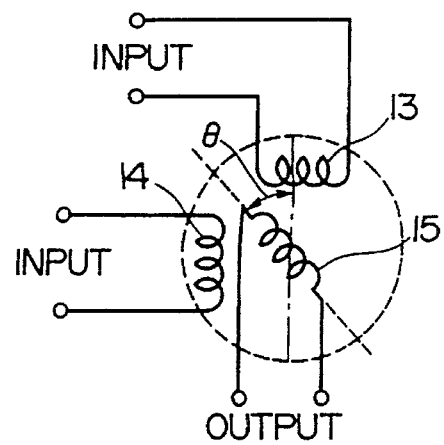
FIG. 5 shows the basic principle underlying the design of a resolver.
Figure 6:
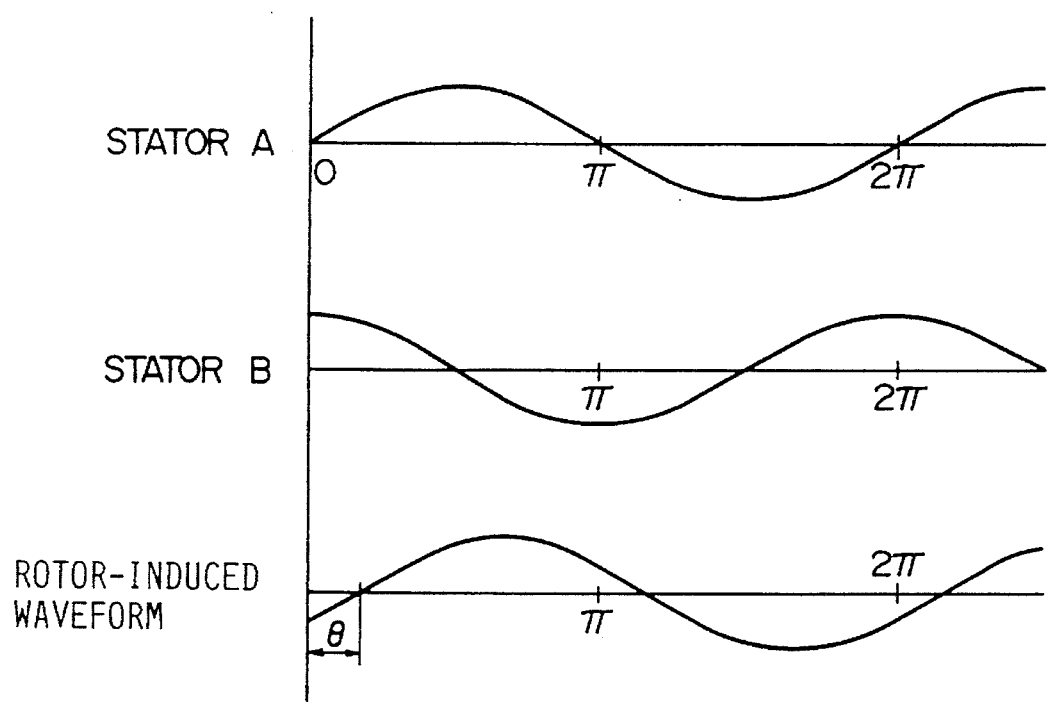
FIG. 6 shows waveforms of excitation signals and output signals produced by a conventional angle of rotation detector.
Figure 7:
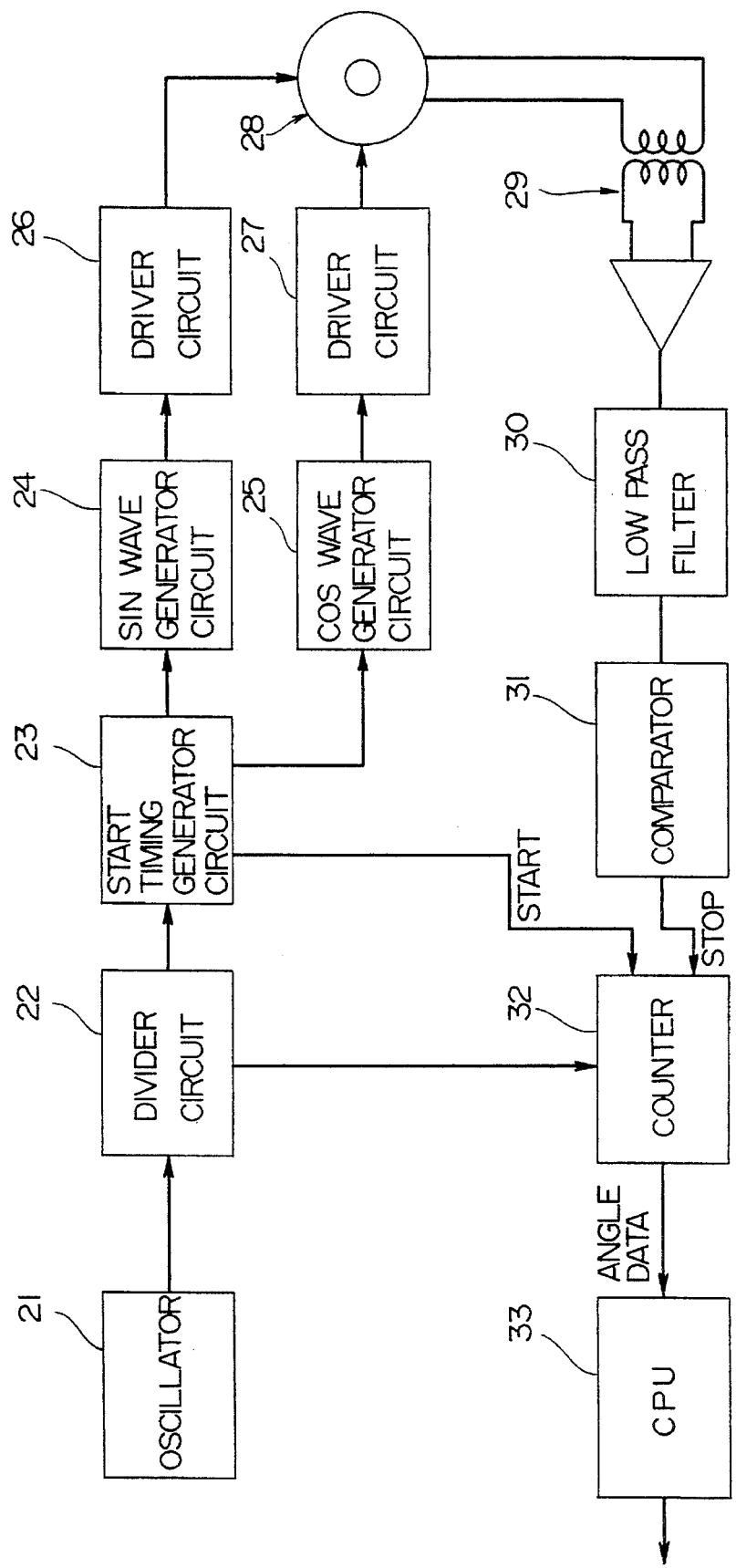
FIG. 7 is a block diagram showing the organization of the circuitry in a conventional angle of rotation detector.

FIG. 4 shows the relationship between frequency and phase difference of the fundamental and higher frequencies for the first embodiment.

After the rotor output is sampled (let $f_s$ be the sampling frequency), it is converted from an analog to a digital signal. At this time, because of the folding phenomenon, data for components at frequencies larger than $f_s/2$ are received as if they represented frequency components below $f_s/2$. That is, after the signal is digitized, the data for the fundamental frequency component E' ($f_B$) can be expressed by the formula $E'(f_B)=E(f_B)+E(f_s-f_B)+E(F_s+f_B)+\ldots \quad (f_s=4f_b, 6f_B, 8f_B \ldots)$ $E'(f_B)=E(f_B)+E(3f_B)+\ldots \quad (f_s=2f_B)$ In this use of a Fourier transform, it is necessary to discover the true fundamental frequency component $E(f_B)$.

In $f_s=2fs$, we must filter the rotor output through a low pass filter which will cut out the frequency components above $3f_B$ before sampling. If $f_s \geq 4f_B$, we must filter the rotor output through a low pass filter which will cut out frequency components above $(f_2-f_B)$ before sampling.

If we use conventional methods, we would need a low pass filter to intercept the frequency component above $2f_B$. Use of the method described herein will allow the filter to be markedly simplified.

We shall next explain, with reference to the flow chart in FIG. 1, the operations involved in calculating the angle through the use of the aforementioned Equation (2) in the embodiment of a rotational angle detector.

First, let the variable n, the real part of the fundamental frequency $Y_r$, and the imaginary part of the fundamental frequency $Y_i$ all be 0 (Step 1-1). Next, the output of A/D converter 7 is input as Ed(0) (Step 1-2). $Ed(n) \times \cos(2\pi n/m)$ is calculated and stored as $Y_r$, and $Ed(n) \times -\sin(2\pi n/m)$ is calculated and stored as $y_i$ (Step 1-3). A judgment is made as to whether $n \geq 8$ (Step 1-4), and if the answer is "no," n is incremented by 1 (Step 1-5) and we return to Step 1-2. The real and imaginary parts of the fundamental frequency are calculated when the output of A/D converter 7 is input at each sampling time. When n=8 in Step 1-4, the equation $$\Theta = \tan\left(\frac{-Y_r}{Y_i}\right)$$

is calculated (step 1-6), and the angle value e is output (Step 1-7).

For the second embodiment, it is possible to select the excitation waveform so that it does not contain even-order harmonics. Such a waveform is expressed by the relationship $f(t+T/2)=-f(t)$.

The even-order harmonic components in the rotor output have a strong tendency to influence the measurement of the angle. If we call the period of the fundamental frequency T ($T=2\pi/\omega$), then from Equation (2) above we can produce:

$$E\left(t+\frac{T}{2}\right) = A_1\sin(\omega t + \pi + \Theta) +$$

$$A_3\sin(3\omega t + 3\pi - \Theta + \phi_3) +$$

$$A_5\sin(5\omega t + 5\pi - \Theta + \phi_5) + \ldots =$$

$$-A_1\sin(\omega t + \Theta) - A_3\sin(3\omega t - \Theta + \phi_3) -$$

$$A_5\sin(5\omega t - \Theta + \phi_5) + \ldots = -E(t)$$

Because $f(t+T/2)=-f(t)$ for both $\sin\omega t$ and $\cos\omega t$, the Fourier transform will yield the same result for both 0·T/2 and T/2~T. Thus if we solve for 0~T/2, we will obtain angle $\Theta$. The equation to be solved is as follows.

$$\Theta = \tan^{-1}\left\{\frac{\sum_{n=0}^{\frac{m}{2}-1} Ed(n) \cdot \cos(2\pi n/m)}{\sum_{n=0}^{\frac{m}{2}-1} Ed(n) \cdot -\sin(2\pi n/m)}\right\}$$

Normally, an angle of rotation detector does not simply detect an angle. It must also transmit its result to the exterior as data, process displays and input, and perform operations to compare the detected value with a reference file. In this embodiment, data are read in, the angle is determined, and calculations are performed during the half-cycle in which the excitation wave is generated. Other processing can be done during the remaining half-cycle. This allows the angle of rotation device to perform other processing simultaneously with angle detection.

With the angle of rotation detector of the third embodiment, the rotor output is sampled, converted from an analog to a digital signal and transferred to a calculation device such as a CPU. The harmonics of the rotor output consist primarily of odd order sequence components. Using the phenomenon that the direction of phase shift corresponding to the revolution of the rotor differs according to the order of harmonic content, the sampling period is set at ¼ of the period corresponding to the fundamental excitation frequency.

For the rotor output at sampling point $t_n$ (n =0, 1, 2, . . . ), if only the fundamental frequency of the excitation wave were contained in the rotor output, $t_n=nt_s$ (n=0, 1, 2, . . . ) at each sampling point, and $t_s=T/4=\pi/(2\omega)$. Thus we can say that $$E_n = A\sin(n\omega t_s + \Theta) = A\sin\left(n \cdot \frac{\pi}{2} + \Theta\right) \quad (3)$$

When harmonics are contained in the excitation wave, then $E=A_1\sin(\omega t+\Theta)+A_3\sin(3\omega t-\Theta+\phi_3) +A_5\sin(5\omega t+\Theta+\phi_5)+\ldots$ Thus the rotor output for $t_n$ (n=0, 1, 2, . . . ) will be $$E_n = A_1\sin\left(n \cdot \frac{\pi}{2} + \Theta\right) + A_3\sin\left(n \cdot \frac{3\pi}{2} - \Theta + \phi_3\right) +$$

$$A_5\sin\left(n \cdot \frac{5\pi}{2} + \Theta + \phi_5\right) + \ldots = A_1\sin\left(n \cdot \frac{\pi}{2} + \Theta\right) +$$

$$A_3\sin\left\{n \cdot 2\pi - \left(n \cdot \frac{\pi}{2} + \Theta\right) + \phi_3\right\} =$$

$$A_5\sin\left\{n \cdot \pi + \left(n \cdot \frac{\pi}{2} + \Theta\right) + \phi_5\right\} + \ldots =$$

$$A_1\sin\left(n \cdot \frac{\pi}{2} + \Theta\right) + A_3\sin\left\{-\left(n \cdot \frac{\pi}{2} + \Theta\right) + \phi_3\right\} +$$

$$A_5\sin\left\{\left(n \cdot \frac{\pi}{2} + \Theta\right) + \phi_5\right\} + \ldots =$$

$$A_1\sin\left(n \cdot \frac{\pi}{2} + \Theta\right) - A_3\sin\left(n \cdot \frac{\pi}{2} + \Theta\right) \cdot \cos\phi_3 +$$

-continued $$A_3\cos\left(n\cdot\frac{\pi}{2}+\Theta\right)\sin\phi_3 + A_5\sin\left(n\cdot\frac{\pi}{2}+\phi_5\right)\cos\phi_5 +$$

$$A_5\cos\left(n\cdot\frac{\pi}{2}+\Theta\right)\sin\phi_5 + \ldots =$$

$$(A_1 - A_3\cos\phi_3 + A_5\cos\phi_5 + \ldots)\sin\left(n\cdot\frac{2}{\pi}+\Theta\right) +$$

$$(A_3\sin\phi_3 + A\sin\phi_5 + \ldots)\cos\left(n\cdot\frac{2}{\pi}+\Theta\right)$$

Here $\phi_3$, $\phi_5$, ... are the phase offsets between the fundamental frequency and the corresponding harmonic components when $\Theta=0$. Thus they have a fixed value regardless of the angle of rotation. If we then assume that $$(A_1 - A_3\cos\phi_3 + A_5\cos\phi_5 + \ldots) = K_s$$

$$(A_3\sin\phi_3 + A_5\sin\phi_5 + \ldots) = K_c$$

we can obtain the following equation.

$$E_n = K_S\sin(n\cdot\pi.2+\Theta) + K_C\cos\left(n\cdot\frac{\pi}{2}+\Theta\right) \quad (4)$$

$$= \sqrt{K_S^2 + K_C^2}\ \sin\left(n\cdot\frac{\pi}{2}+\Theta+\phi\right)$$

$$\Psi = \tan^{-1}\frac{K_C}{K_S}$$

If we compare the above with Equation (3), which applies to the fundamental frequency only, we see that the amplitude has changed and an offset has appeared in the phase. However, when one is using a resolver to measure the angle, it is preferable that the value of the amplitude be fixed. It is also general practice to correct the phase offset at the time the resolver is mounted so that it does not present an obstacle to the measurement of the angle.

In other words, we set the sampling period at ¼ of the period corresponding to the fundamental frequency of excitation. By doing this, we can insure that our measurement is not affected by harmonics even if the excitation frequency is a non-sine wave which contains odd order harmonics. This enables us to measure the angle with great accuracy.

If the sampling period is set at some duration other than ¼ the period corresponding to the fundamental frequency of the excitation wave, the relationship of Equation (4) above will not obtain.

By setting the sampling period at T/4 as described above, we can avoid errors which arise from odd order harmonics despite the fact that we are using rectangular waves or other easily generated non-sinusoidal waveforms as excitation waves. Angle detection can thus be accomplished with a simple design and at a low cost.

Figure 10:
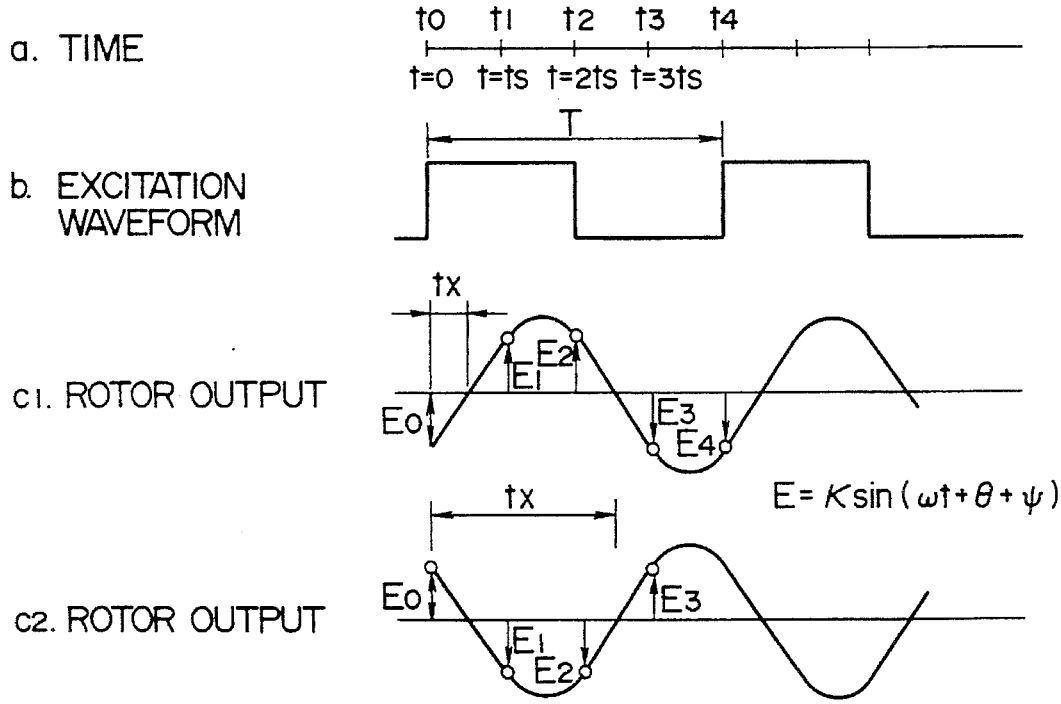
FIG. 10 shows waveforms which illustrate the operating principle of the third embodiment.

We shall next explain the principle by which the angle of rotation detector in this embodiment calculates the angle. With reference to FIG. 10, the rise of the current waveform from the excitation coil in stator A is used as a reference. If we obtain the reference point and the time $t_x$ which is the zero crossing point of the rotor output, then the angle of rotation $\Theta+\phi$ can be calculated by solving the equation $$\Theta+\phi=360\times(t_x/T)$$

The time $t_x$ that it takes to reach the zero crossing point can be determined by performing a straight line interpolation between the voltage values at the measurement points before and after the zero crossing point and the voltage value. Because $$\frac{t_x}{t_s - t_x} = \frac{E_0}{E_1}$$

we can obtain the following equation.

$$t_s = \frac{E_0}{E_0 + E_1}\cdot t_x$$

The explanation above covers cases in which the zero crossing point falls between $t_0$ and $t_1$. If $t_x$ falls outside the range defined by those two points, it can be obtained by including in the calculation the sampling time up to the sample just before the zero crossing point.

Figure 11:
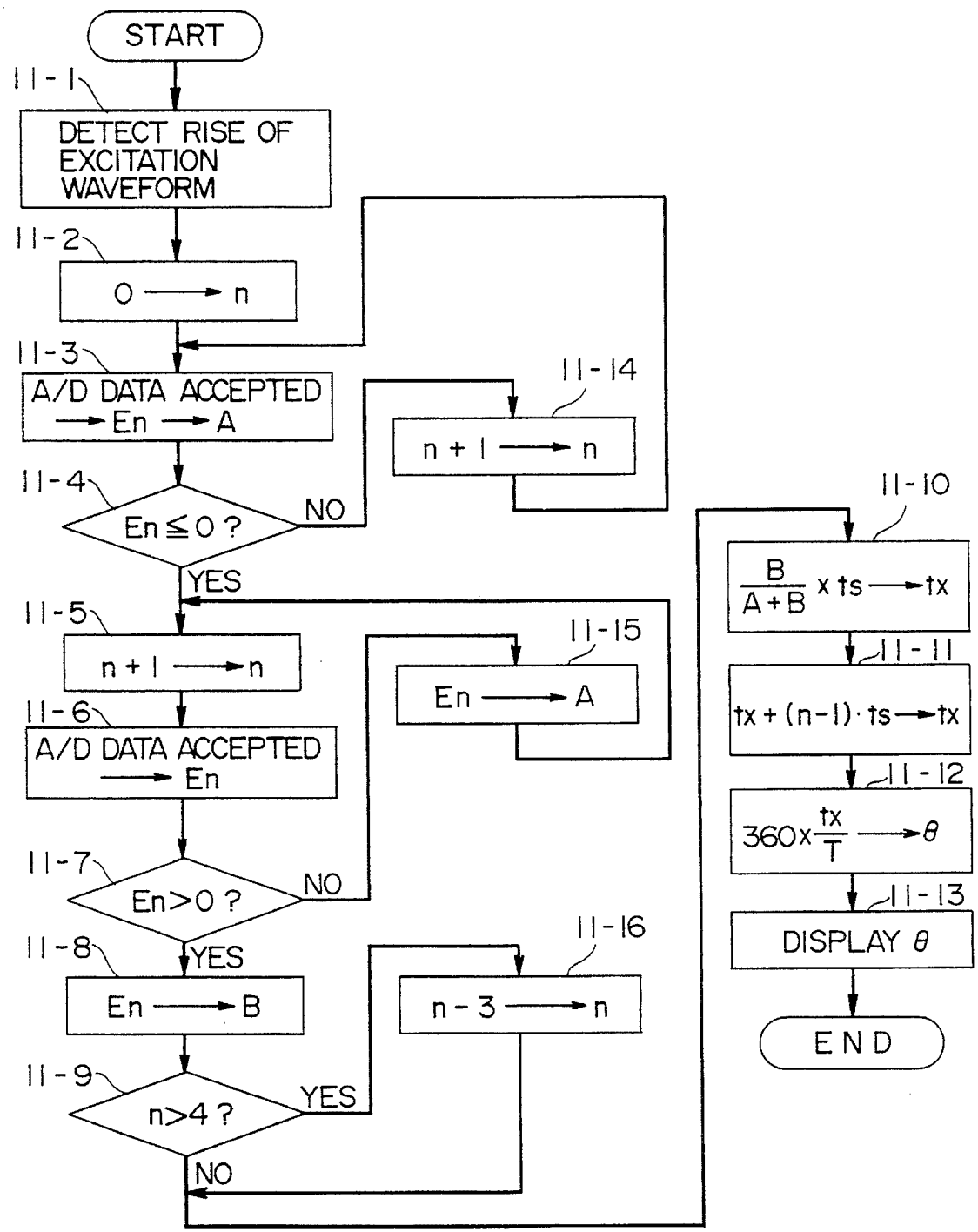
FIG. 11 is a flowchart showing operations performed by the third embodiment detector.

We shall next explain the operations involved in determining the angle of rotation using straight line interpolation, with reference to the flowchart shown in FIG. 11. First, the rise of the excitation wave is detected (Step 11-1), and variable n is set to 0 (Step 11-2). The output of the A/D converter for that point is accepted and called $E_0$. This datum is stored in A (Step 11-3). A judgment is made as to whether $E_n \leq 0$ (Step 11-4). If $E_0$ is negative, as shown in Illustration $C_1$ of FIG. 3, then the judgment in Step 11-4 will be "yes," and we move to Step 11-5, in which variable n is incremented by 1 (n=1). At the next sampling time, the output of A/D converter 7 is accepted (Step 11-6) and called $E_1$. A judgment is made as to whether $E_n > 0$ (Step 11-7). When $E_n = E_1$, and the wave has crossed the zero crossing point and is now positive, as shown in FIG. 10, the judgment in Step 11-7 will be YES. The fact that $E_n = E_1$ at this time will be stored in B (Step 11-8), and a judgment will be made as to whether n>4 (Step 11-9). If, for example, n=1, the judgment will be NO, and we will move to Step 11-10, which is to calculate $B/(A+B)\times t_s \to T_x$. Next we calculate $t_x + (n-1)\cdot t_s \to t_x$ (Step 11-11). At this point, n=1, so $t_x$ will have a value identical to the $t_x$ calculated in Step 10. Now we can determine the angle by solving $360\times t_x/T \to \Theta$ (Step 11-12). The angle e which has been calculated is then displayed on display 8 (Step 11-13).

Let us consider the case in which the rotor output supplied by A/D converter 7 to calculation device 1 has the waveform shown in Illustration $C_2$ of FIG. 10. Then in Step 11-3 of the flowchart shown in FIG. 11, the data used will be $E_0$, which will be assigned to A. When the judgment is rendered in Step 11-4 as to whether $E_n \leq 0$, the answer will be NO, because $E_0$ is positive. In Step 11-14, n will be incremented by 1, and with n equal to 1, we return to Step 11-3. At the next sampling time, datum $E_1$ will be accepted and again assigned to A. When the judgment of whether $E_n \leq 0$ is made, the answer will be YES, as $E_1$ is negative. We then move to Step 11-5 and increment n by 1 so that n=2. At the next sampling time, datum $E_2$ is accepted, and a judgment is made as to whether $E_n > 0$. Since $E_2$ is negative, the judgment will be NO, and we move to Step 11-15. $E_2$ is assigned to A and we return to Step 11-5. n is incremented by 1, and at the next sampling time, datum $E_3$ is accepted (Step 11-6). Once again the judgment is made as to whether $E_n > 0$. Because $E_3$ is positive, this judgment will be YES, and datum $E_3$ will be assigned to B (Step 11-8). A judgment is made as to whether n>4 (Step 11-9). Because the judgment is NO, we move to Step 11-10 and calculate $B/(A+B)\times t_s$. When $t_x + (n-1)\ t_s$ is calculated in Step 11-11, we get $t_x + 2t_s$, which becomes $t_x$. Thus $2t_s$ is added to the $t_x$ obtained in Step 11-10, which gives us the time $t_x$ needed to calculate angle $\Theta$.

We shall now discuss a variation of this third embodiment of this invention. Using a circuit identical to that shown in FIG. 2, the signal is digitized at the rate corresponding to ¼ of the period of the excitation signal. According to Equation (4) above, the outputs $E_0$ and $E_1$ of the A/D converter corresponding to n=0 and n=1 are $$E_0 = \sqrt{K_s^2 + K_x^2} \sin(\Theta + \phi)$$

$$E_1 = \sqrt{K_s^2 + K_c^2} \sin\left(\frac{\pi}{2} + \Theta + \phi\right)$$

$$= \sqrt{K_2^2 + K_c^2} \cos(\Theta + \phi)$$

Thus we can say that $$\frac{E_0}{E_1} = \tan(\Theta + \phi)$$

In other words, we can discover the rotor's angle of rotation $\Theta + \phi$ by calculating $$\Theta + \phi = \tan^{-1} \frac{E_0}{E_1}$$

from two data points after sampling has begun.

In the same fashion, the output $E_2$ of the A/D converter for the point n=2 can be obtained by the following equation.

$$E_2 = \sqrt{K_s^2 + K_c^2} \sin(\pi + \Theta + \phi)$$

$$= -\sqrt{K_s^2 + K_c^2} \sin(\Theta + \phi)$$

Thus we can say that $$\frac{E_2}{E_1} = -\tan(\Theta + \phi)$$

We can obtain $\Theta + \phi$ in the same way. Depending on whether the n in the term $n \times \pi/2$ in Equation (4) is even or odd, $\sin(n \cdot \pi/2 + \Theta + \phi)$ will be equal to either $\pm\sin(\Theta + \phi)$ or $\pm\cos(\Theta + \phi)$. Thus we can determine the rotational angle of the rotor by calculating the inverse tangent of the quotient of the two adjacent data points.

The fact that we can detect the angle by the use of two adjacent data points means that we can collect data during ¼ of the period of the excitation wave and use the remaining ¾ of the period for calculation and other processing which can be performed by the calculation device. Normally, an angle of rotation detector does not simply determine the angle. It must also transmit this data to the exterior, display it, and compare it with a reference file. Using this method to determine the angle of rotation allows the angle calculation device to perform other processing easily, and it allows us to realize an angle detector with high capabilities and a simple design.

Figure 2:
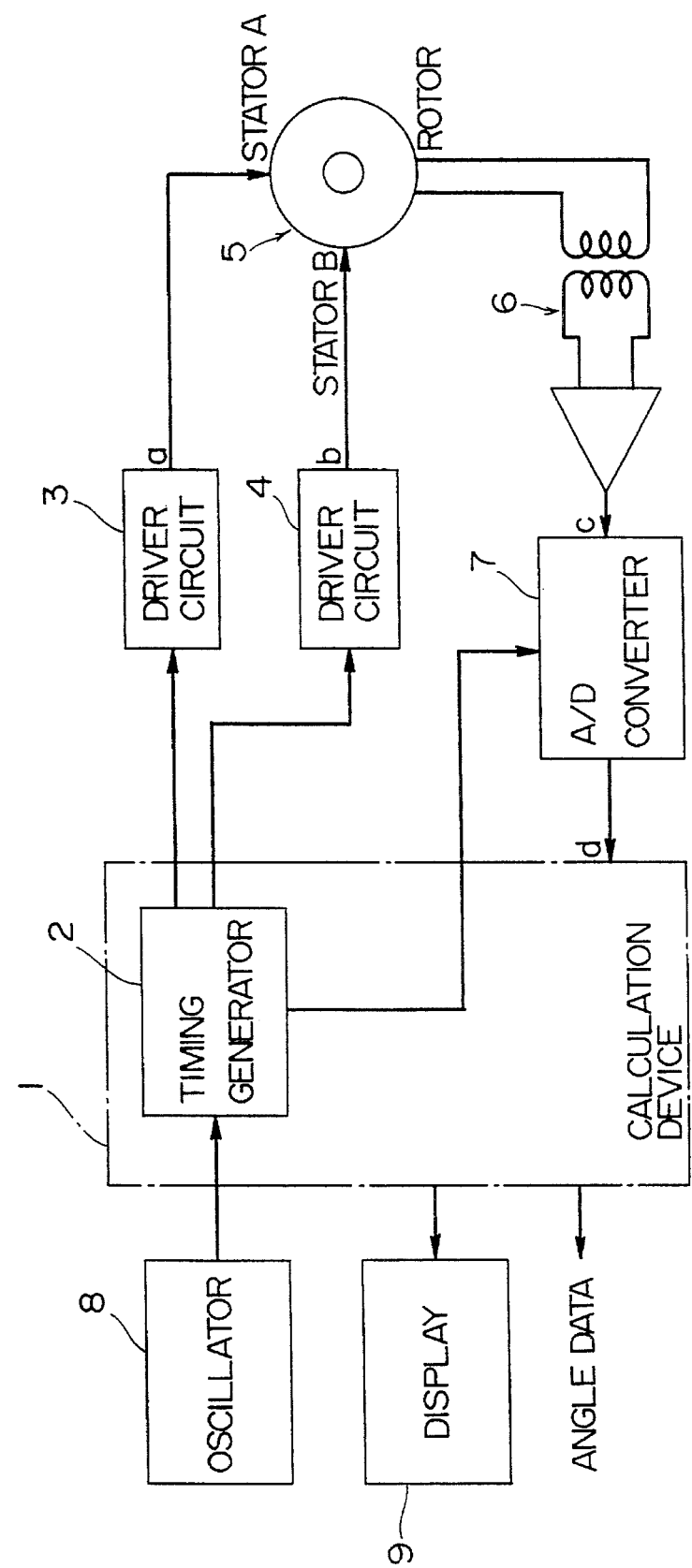
FIG. 2 is a block diagram of the angle of rotation detector in FIG. 1.
Figure 2A:
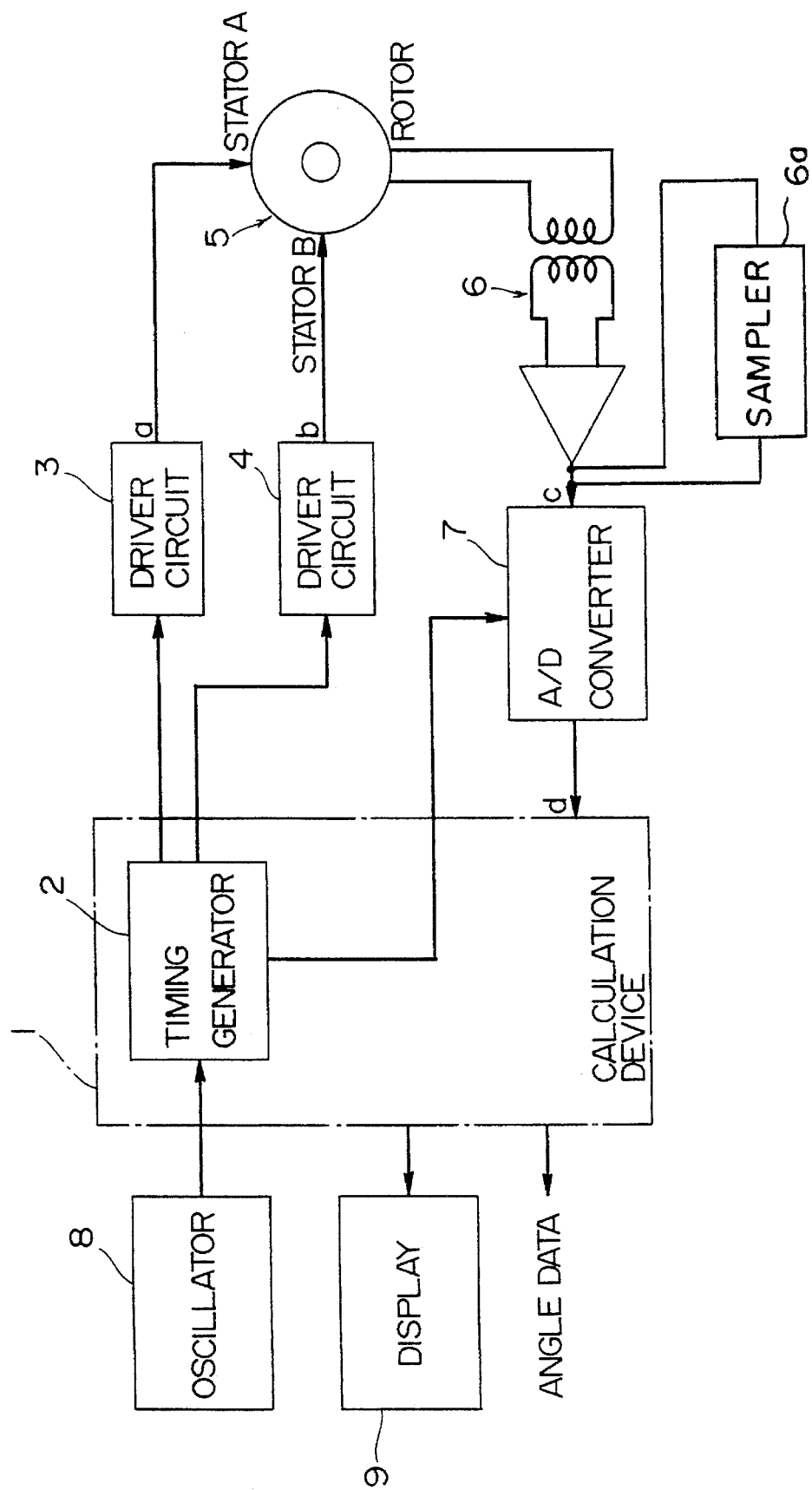
FIG. 2b is an alternative block diagram according to the invention.
Figure 3:
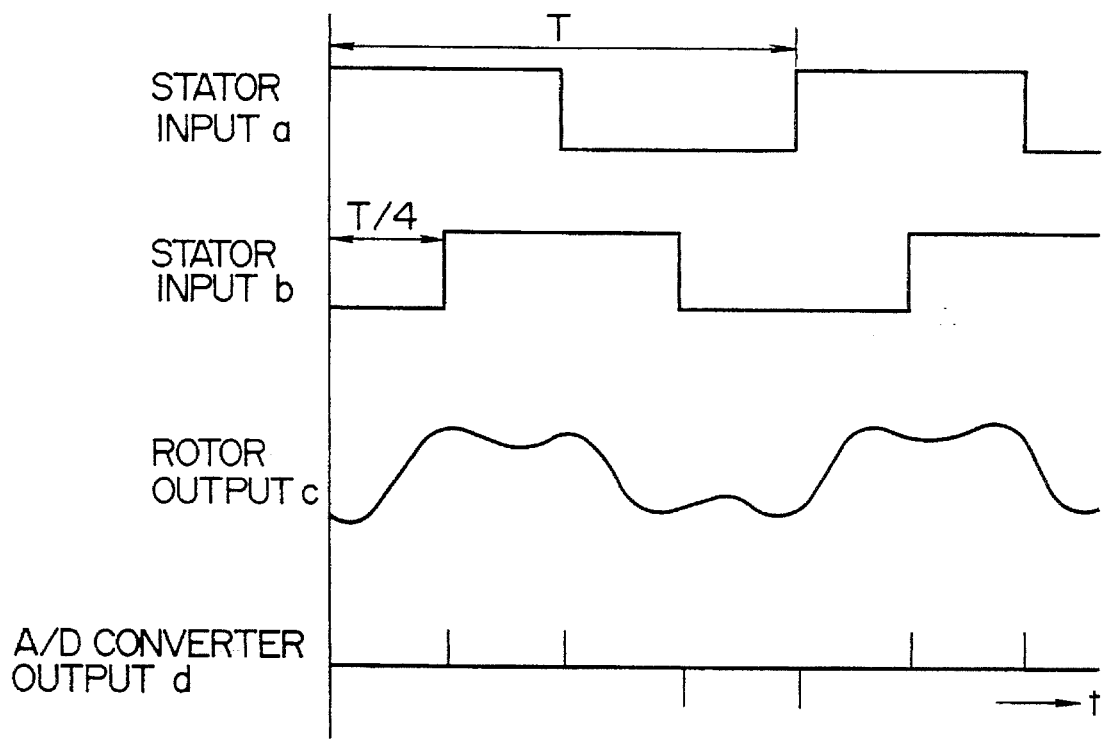
FIG. 3 shows waveforms which illustrate the operation of the angle of rotation detector of the first embodiment in FIG. 1.
Figure 12:
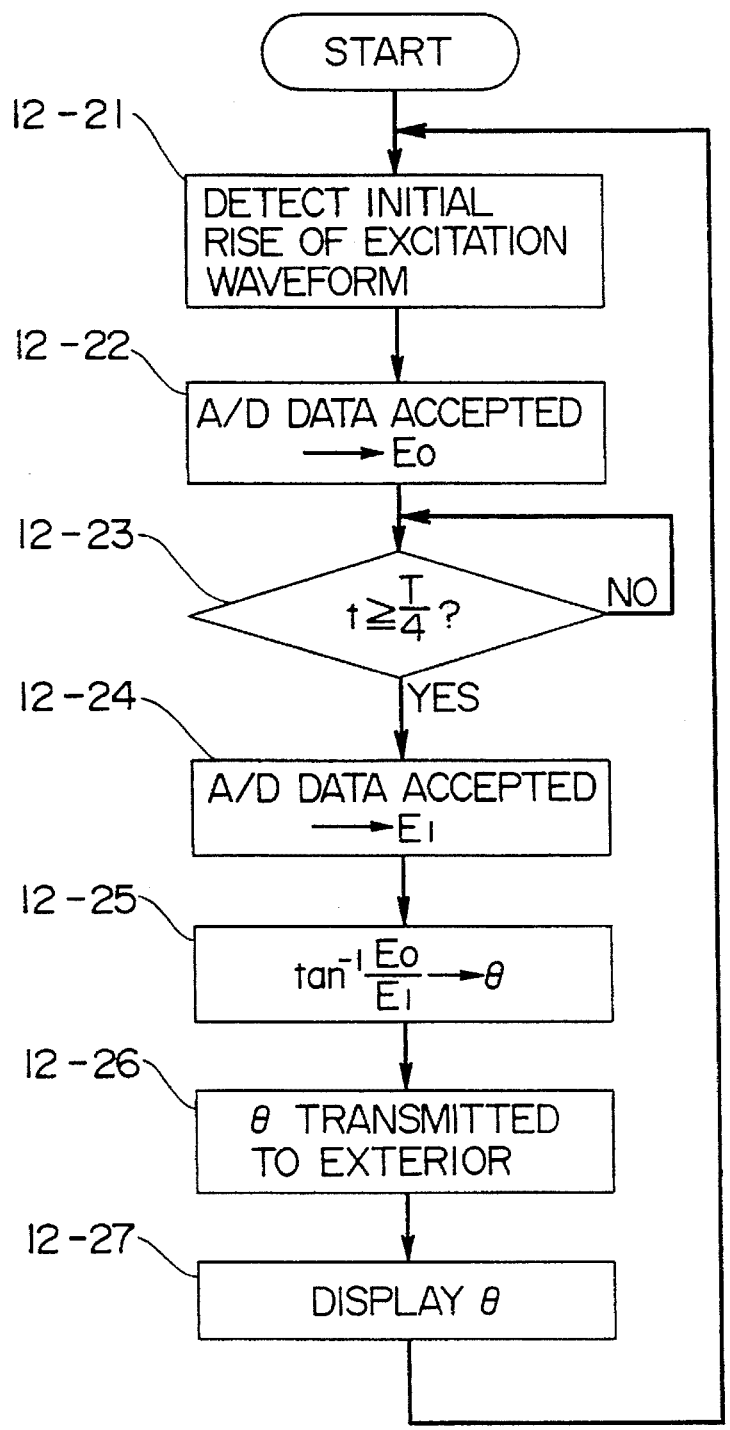
FIG. 12 is a flowchart showing the operations performed by a variation of the third embodiment of the invention.

The angle of rotation detector of this embodiment detects angle $\Theta$ by performing the operations shown in the flowchart in FIG. 12 with calculation device 1 shown in FIG. 2. It first detects the initial rise of the excitation waveform from stator A (Step 12-21). It then accepts the output from A/D converter 7 for that moment and stores it as $E_0$ (Step 12-22). It determines whether or not a time t, which is equal to or more than ¼ of the period T of the excitation signal, has elapsed since the detection of the initial rise (Step 12-23). At the point where ¼ of the period has elapsed, it accepts the output of A/D converter 7 and stores it as $E_1$ (Step 12-24). From the data values $E_0$ and $E_1$ it computes $\tan^{-1} E_0/E_1$ to calculate angle $\Theta$ (Step 12-25). It transmits the data for $\Theta$ to the exterior (Step 12-26) and displays angle $\Theta$ on display 9 (Step 12-27).

We shall next discuss another embodiment of this invention.

A circuit of the same design as that shown in FIG. 1 accepts the output of A/D converter 7 each ¼ period of the excitation signal, as in the previous embodiment. The rotor output can be expressed as $$E = \sqrt{K_s^2 + K_c^2} \sin(\omega t + \Theta + \phi)$$

$$= K\sin(\omega t + \Theta + \phi)$$

Thus we can use the following simple method to determine the rotational angle of the rotor.

Figure 13:
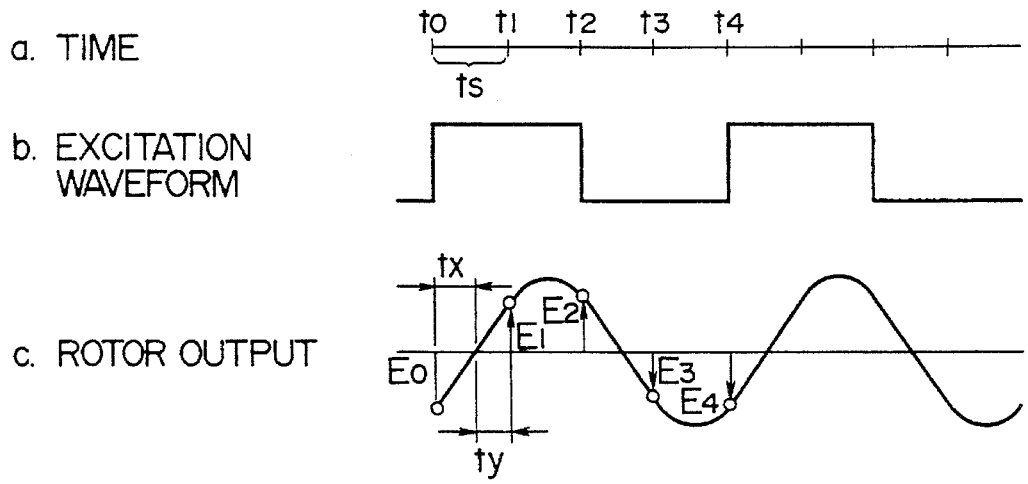
FIG. 13 shows waveforms which illustrate the operating principles of the embodiment in FIG. 12.

If we use the initial rise of the current waveform from the excitation coil in stator A shown in FIG. 13 as the reference, and we determine the time $t_x$ of the zero crossing point for the reference point and the rotor output, then we can calculate the rotor's angle of rotation $\theta + \phi$ by solving $$\theta + \phi = 360 \times \frac{t_x}{T}$$

If we call the output value of the A/D converter at the first sampling time $t_y$ after the zero crossing point $E_1$ (See FIG. 13), then $$E_1 = K \sin \omega t_y$$

Thus we can determine $t_y$ by solving the equation $$t_y = \sin^{-1} \frac{E}{K}$$

which derives from the fact that $t_x = t_s - t_y$.

Here the amplitude K is a fixed value. It might be stored in the calculation device when the angle detector is shipped from the factory, and the amplitude can be checked at regular intervals and the value be newly stored as data.

If the rotor output is processed in this way, as if it consisted only of its fundamental frequency component, the rotational angle of the rotor can be determined from the single, clear data point which represents the time elapsed from the reference point of the excitation wave until after the zero crossing. Data after the zero crossing are not the only ones that can be used. Data before the zero crossing or a single data point just before or after a fixed value within the amplitude range is crossed can also be employed. In these cases, it is preferable to choose a point which can be specified as to which quadrant it falls into: $0 \sim \pi/4$; $\pi/4 \sim \pi/2$; $\pi/2 \sim 3\pi/4$; or $3\pi/4 \sim 2\pi$. That is to say, observing in advance whether a given point falls into a specific quadrant will permit you to perform the calculation using a single data point, which will reduce the processing which must be performed by the calculation device.

In addition to angle detection, this method also simplifies other processing performed by the angle detector, such as transmission of data to the exterior and display of data. It enables us to realize an angle detector with a simple design and high capabilities.

Figure 14:
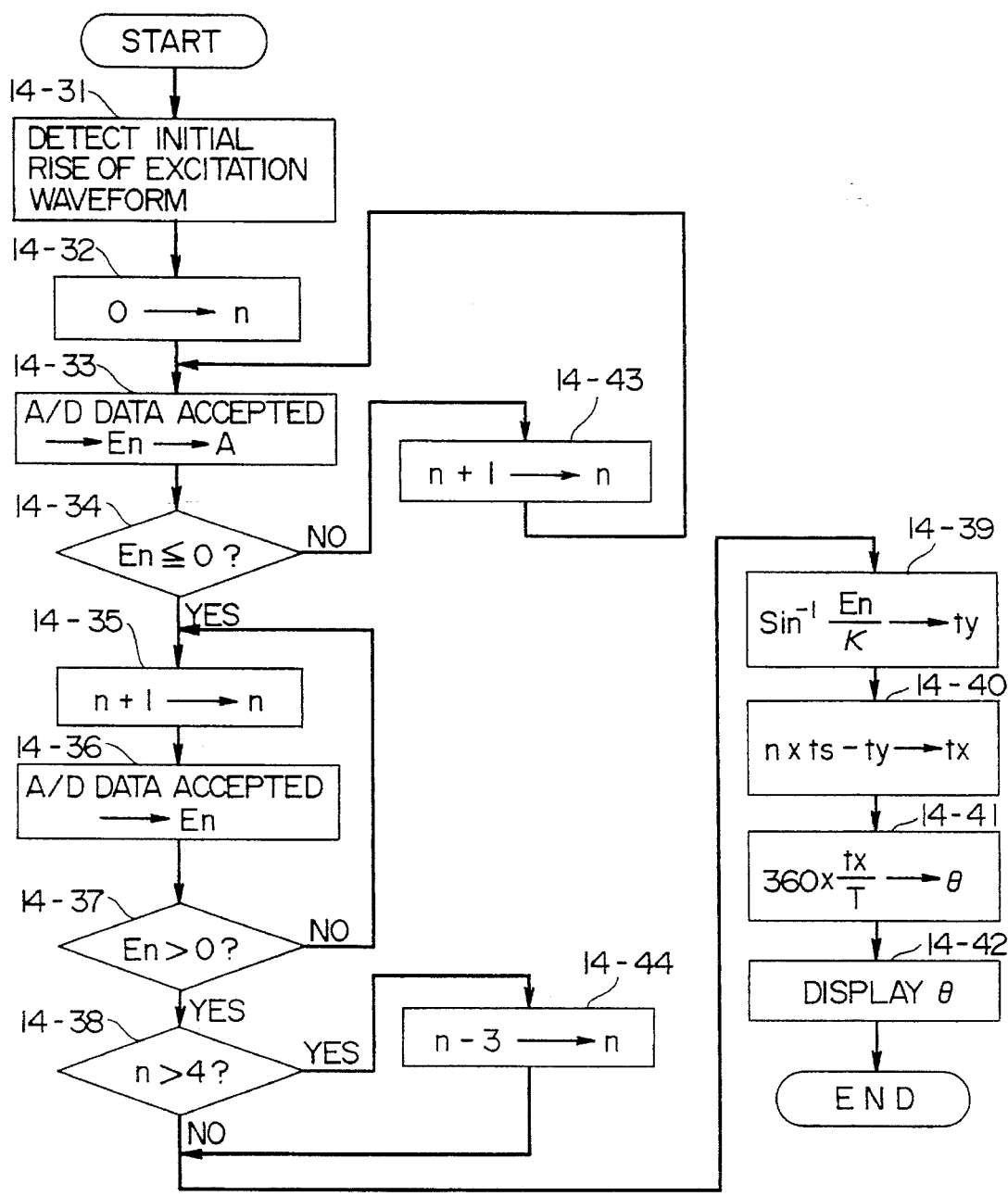
FIG. 14 is a flowchart showing the operations performed by another variation of the third embodiment.

We shall next explain the operations involved in detecting an angle of rotation using this method, with reference to the flowchart in FIG. 14. First, the rise of the excitation wave is detected (Step 14-31), and the variable n is set to 0 (Step 14-32). The output of A/D converter 7 is accepted and stored in storage register A as $E_0$ (Step 14-33). A judgment is made as to whether $E_n<0$ (Step 14-34). If the judgment is YES, as pictured in FIG. 13, the variable n is incremented by 1 (n=1) (Step 14-35). At the next sampling time, the output of A/D converter 7 is accepted and called $E_1$ (Step 14-36). A judgment is made as to whether $E_1>0$ (Step 14-37). If the answer is YES, as pictured, then the zero crossing point falls between the previous sampling time and the current one. A judgment is made as to whether n is greater than 4 (Step 14-38). In the example, the answer is NO, so $\sin^{-1}E_1/K$ is calculated, and time $t_y$ from the zero crossing point to the current sampling time is determined (Step 14-39). The next calculation is $n \times t_s$, in this case $1 \times t_s$. From $t_2-t_y$ we can determine time $t_x$ from the initial rise to the zero crossing point (Step 14-40). Then by solving $360 \times t_x/T$ we can determine angle $\Theta$ (Step 14-41), and we can display this value on display 8 (Step 14-42).

Let us now assume a case in which the zero crossing point from negative to positive occurs where $t_2<t<2t_s$. The judgment in Step 14-34 as to whether $E_0 \leq 0$ will be YES. In Step 14-35, n will go to 1, and in Step 14-36, the output of A/D converter 7 will be accepted as $E_1$. This $E_1$, however, will also be negative, so the judgment in Step 14-37 as to whether $E_n>0$ will be NO, and n will once again be incremented so that it will go to 2. In Step 14-36 the output of A/D converter 7 will be accepted as $E_2$. This $E_2$ occurs after the zero crossing point, so it will be positive. Thus, the judgment in Step 14-37 as to whether $E_n>0$ will be YES. In this case, the calculation in Step 14-40 will be $2 \times t_s - t_y$, and angle $\Theta$ can be determined by solving $360 \times 2 \times t_s - t_y/T$.

Now let us assume that a zero crossing point from positive to negative occurs between 0 and $t_s$. The judgment in Step 14-34 will be NO, so variable n will be incremented by 1 in Step 14-43 (n=1). At the next sampling time $t_1$, the output of A/D converter 7 will be accepted into storage register A as $E_1$. In Step 14-34, the judgment as to whether $E_n \geq 0$ will be YES, and in Step 14-35 the variable n will be incremented by 1 (n=2). The A/D data will be accepted and stored as $E_n=E_2$. In Step 14-37, when a judgment is made as to whether En>0, the answer will be NO, and we will return to Step 14-35, where n will be incremented by 1 again (n=3). At the next sampling time, $E_3$ is accepted and stored (Step 14-36). Since this $E_3$ is positive, the judgment rendered in Step 14-37 will be YES. Accordingly, $t_x$ will be calculated in Step 14-40 by solving $3 \times t_s - t_1$, and the phase angle $\Theta$ will be determined by solving $360 \times (3 \times t_s \times t_1/T)$ (Step 14-41).

In a fourth embodiment, an angle of rotation detector detects an angle of rotation using a . resolver with one rotor coil and two stator coils. It is equipped with a drive unit which supplies excitation signals phase-shifted by 90° from each other to the two stators. A means to digitize the output of the rotor, which means samples the output waveform at a minimum of two points which differ from each other but have a fixed time relationship with respect to the drive waveform outputs the data. A memory means is used to store previously measured relationships between rotor output and angle of rotation. The rotation angle detector also has a means to compare the output of the digitizing A/D conversion device with the reference data stored in the memory or other storage unit in order to determine the resolver's angle of rotation.

This angle of rotation detector supplies excitation signals having a phase difference of 90° to two rotors. This causes a circular magnetic field to be generated-in the rotors. An output signal is induced which has a phase shift corresponding to the rotational angle of the rotors. This output signal is digitized by the A/D conversion device and input into the comparison device. This device reads out an angle of rotation based upon the characteristic relationship between the rotor output and the angle of rotation which was stored in the storage device. In this way the rotor's angle of rotation is obtained.

In the variation of this embodiment, the memory means stores as constants values which have been previously input for the amplitude and phase of the harmonic components of the excitation wave contained in the rotor output. The calculating means includes means to calculate an inverse trigonometric function using the output of the digitizing A/D conversion device and the constants in order to determine the rotational angle of the resolver.

A circular magnetic field is generated in the rotors by the out-of phase excitation signals, as discussed above. An output signal is induced which has a phase shift corresponding to the rotational angle of the rotors. This output signal is input into the calculation device, where an inverse trigonometric calculation is performed based on the input signal from the A/D conversion device and the constants stored in the storage unit. In this way the rotational angle of the resolver is obtained. In the following section, we shall describe several embodiments of the invention in order to explain in detail how they work.

Figure 16:
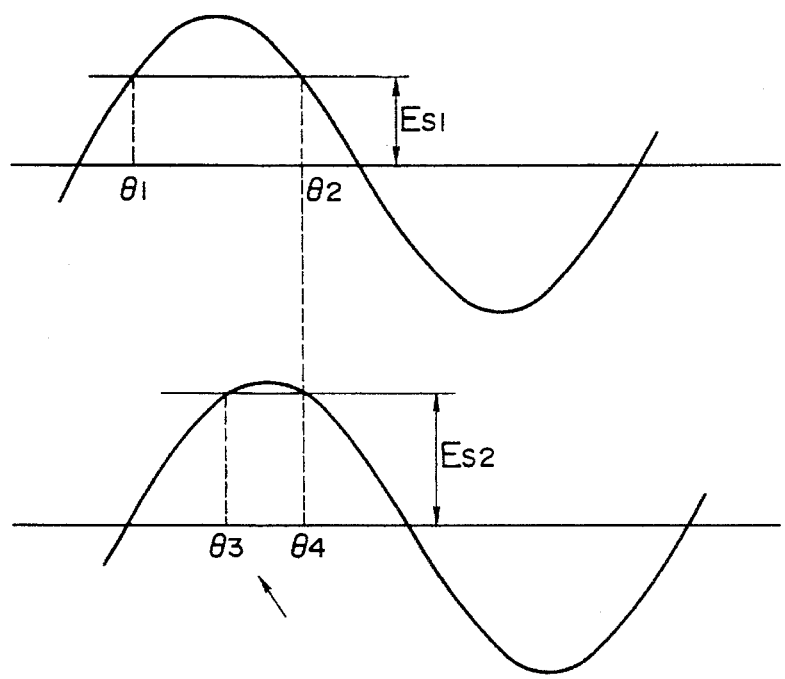
FIG. 16 shows two waveforms which illustrate the principle underlying the angle of rotation detector shown in FIGS. 15a and 15b.

In a fourth embodiment shown in FIG. 16, the relationship between the rotor and the angle of rotation, i.e., how the rotor output relates to the angle of rotation, has been previously measured and is stored in memory 19. The output from A/D converter 7 is compared with the data stored in memory 19 by comparison unit 18 in calculation unit 1, and the angle data are output.

Let us assume that we are sampling the rotor output, including its harmonic components, at reference points synchronous with the excitation wave.

The output of the rotor can be expressed as:

$$E_1 = A_1\sin(\omega t + \Theta) + A_3(3\omega t - \Theta + \phi_3) + A_5\sin(5\omega t + \Theta + \phi_5) + \ldots$$

where $A_1$, $A_3$, and $A_5$ are the amplitudes of the various components, and $\phi_3$, $\phi_5$, ... are the phase offsets between the fundamental frequency and each corresponding harmonic. Thus the voltage $E_s$ at point $t_s$ can be expressed as:

$$\begin{aligned}
E_s &= A_1\sin(\omega t_s + \Theta) + A_3(3\omega t_s - \Theta + \phi_3) + \\
&\quad A_5\sin(5\omega t_s + \Theta + \phi_5) + \ldots \\
&= A_1\sin\omega t_s \cdot \cos\Theta + A_1\cos\omega t_s \cdot \sin\Theta + \\
&\quad A_3\sin(3\omega t_s + \phi_3 \cdot \cos\Theta) - A_3(3\omega t_s + \phi_3)\sin\Theta + \\
&\quad A_5\sin(5\omega t_s + \phi_5)\cos\Theta + \\
&\quad A_5\cos(5\omega t_s + \phi_5)\sin\Theta + \ldots, \\
&= \{A_1\cos\omega t_s - A_3\cos(3\omega t_s + \phi_3) + \\
&\quad A_5\cos(5\omega t_s + \phi_5) + \ldots\}\sin\Theta + \\
&\quad \{A_1\sin\omega t_s + A_3\sin(3\omega t_s + \phi_3) + \\
&\quad A_5\sin(5\omega t_s + \phi_5) + \ldots\}\cos\Theta
\end{aligned}$$

Because $\omega t_s$, $A_1$, $A_3$, and so on, $\phi_3$, $\phi_5$, and so on are fixed values, if we posit that $$A_1\cos\omega t_s - A_3\cos(3\omega t_s + \phi_3) + A_5\cos(5\omega t_s + \phi_5) + \ldots = K_s$$

$$A_1\sin\omega t_s - A_3\sin(3\omega t_s + \phi_3) + A_5\sin(5\omega t_s + \phi_5) + \ldots = K_c$$

then $$E_s = K_s \sin\Theta + K_c \cos\Theta$$
$$= \sqrt{K_s^2 + K_c^2} \sin(\Theta + \phi)$$
$$\phi = \tan^{-1} \frac{K_c}{K_s}$$

In other words, if we know the values for $\omega t_s$, $A_1$, $A_3$, and so on, $\phi_3$, $\phi_5$, and so on, then we can determine the value of $\Theta$ by solving $$\Theta = \sin^{-1} \frac{E_s}{\sqrt{K_s^2 + K_c^2}} - \phi$$

The sampling points are fixed, and the amplitude and phase do not vary once the resolver and resolver cable are fixed. Thus the values for $E_s$ corresponding to the various $\Theta$ can be measured, tabulated, and stored in the memory when the angle detector is shipped by the factory or when it is installed. Thereafter, the angle can be determined by comparing the output of the A/D converter with the reference data in the table. The embodiment described above is a circuit designed to realize this method of angle detection.

Because the solution of $$\sin^{-1} \frac{E_s}{\sqrt{K_s^2 + K_c^2}} - \phi$$

is the same at two points in each cycle, the data are sampled at two different points of time relative to the reference point. When these data are compared with the reference values in the table, an unambiguous measurement of the angle can be obtained. For example, with the two outputs $E_{s1}$ and $E_{x2}$ shown in FIG. 16, we can use two data points from the table to obtain $\Theta_1$ and $\Theta_2$ from $E_{s1}$ and $\Theta_3$ and $\Theta_4$ from $E_{s2}$. By obtaining the two coincident angles $\Theta_2$ and $\Theta_4$, we can determine the angle of rotation.

With the device in this example, measurement is not affected by harmonic components even though the excitation waves are non-sinusoidal waves, which are easier to generate. The angle of rotation can be determined accurately without the need for a sine wave generator circuit or a low pass filter. As a result, the cost of the device can be held down. Data are sampled at as few as two points per cycle, which frees processing time in the calculation device for data display, key input, and comparison of observed data with reference data. Thus the invention allows us to realize an angle of rotation detector with high capabilities and a simple design.

Figure 15:
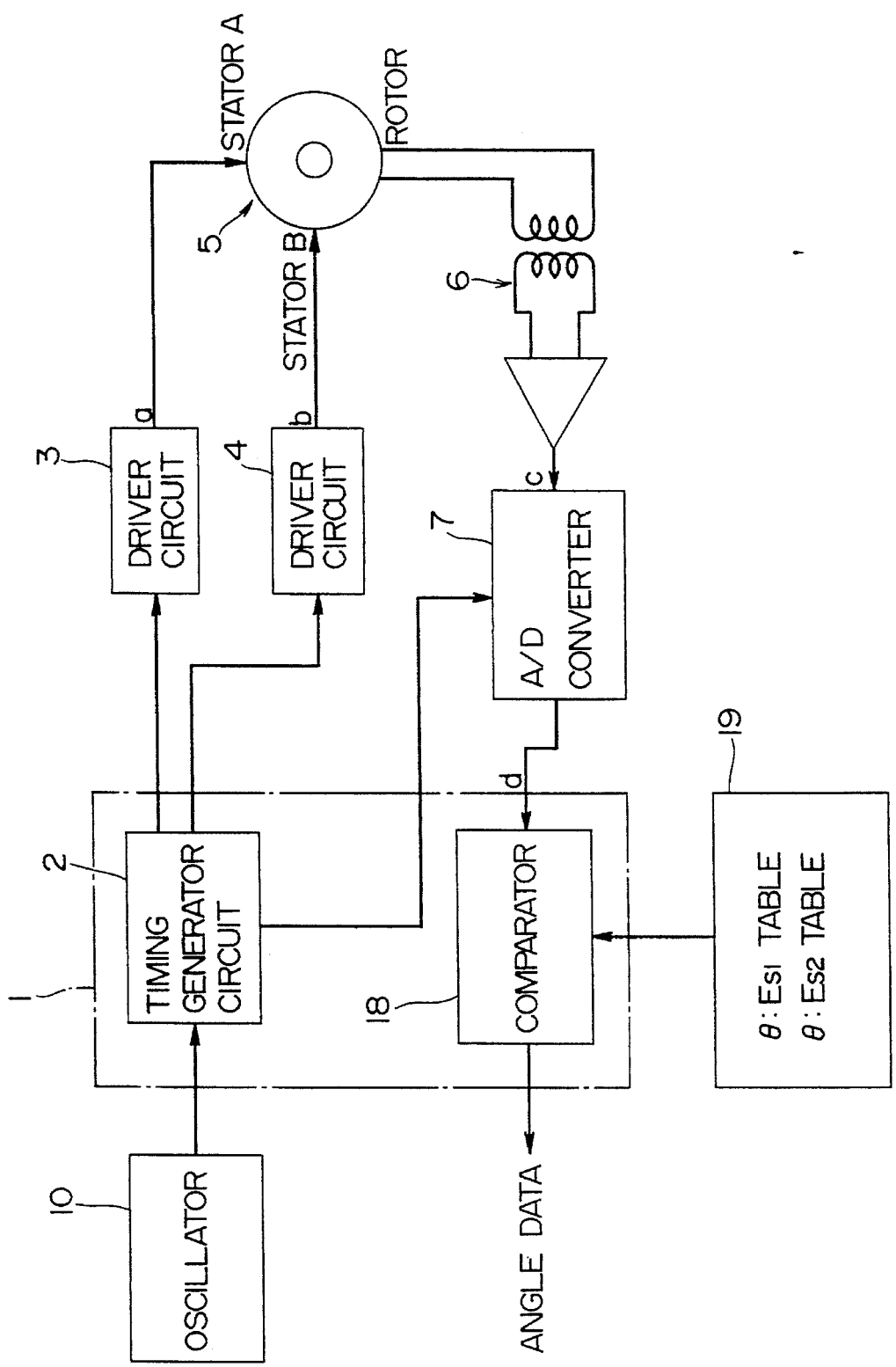
FIGS. 15a and 15b are a block diagram illustrating the organization of an angle of rotation detector in which the relationship between the rotor output and the angle of rotation has been stored in memory.
Figure 15A:
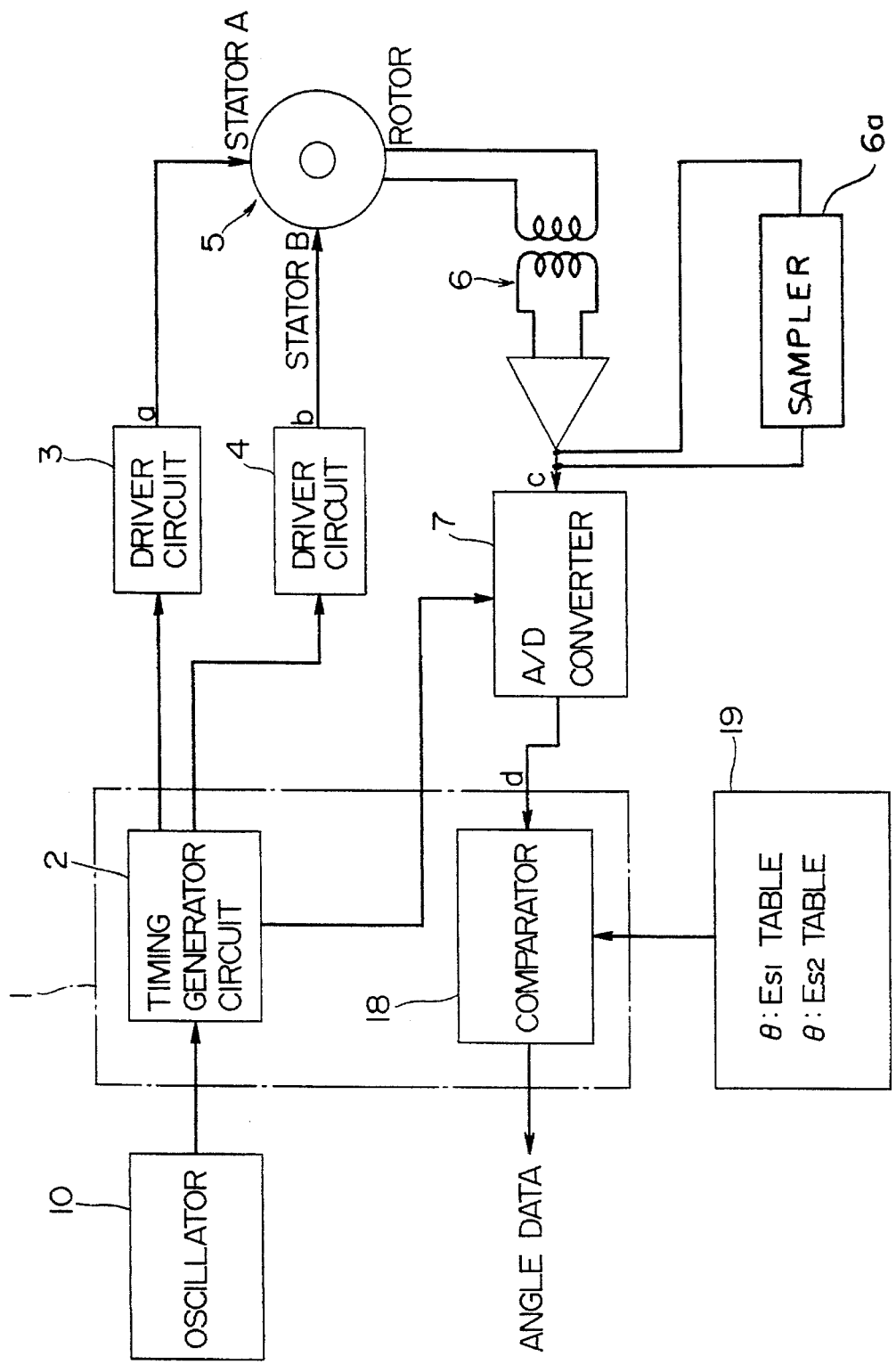
Figure 17:
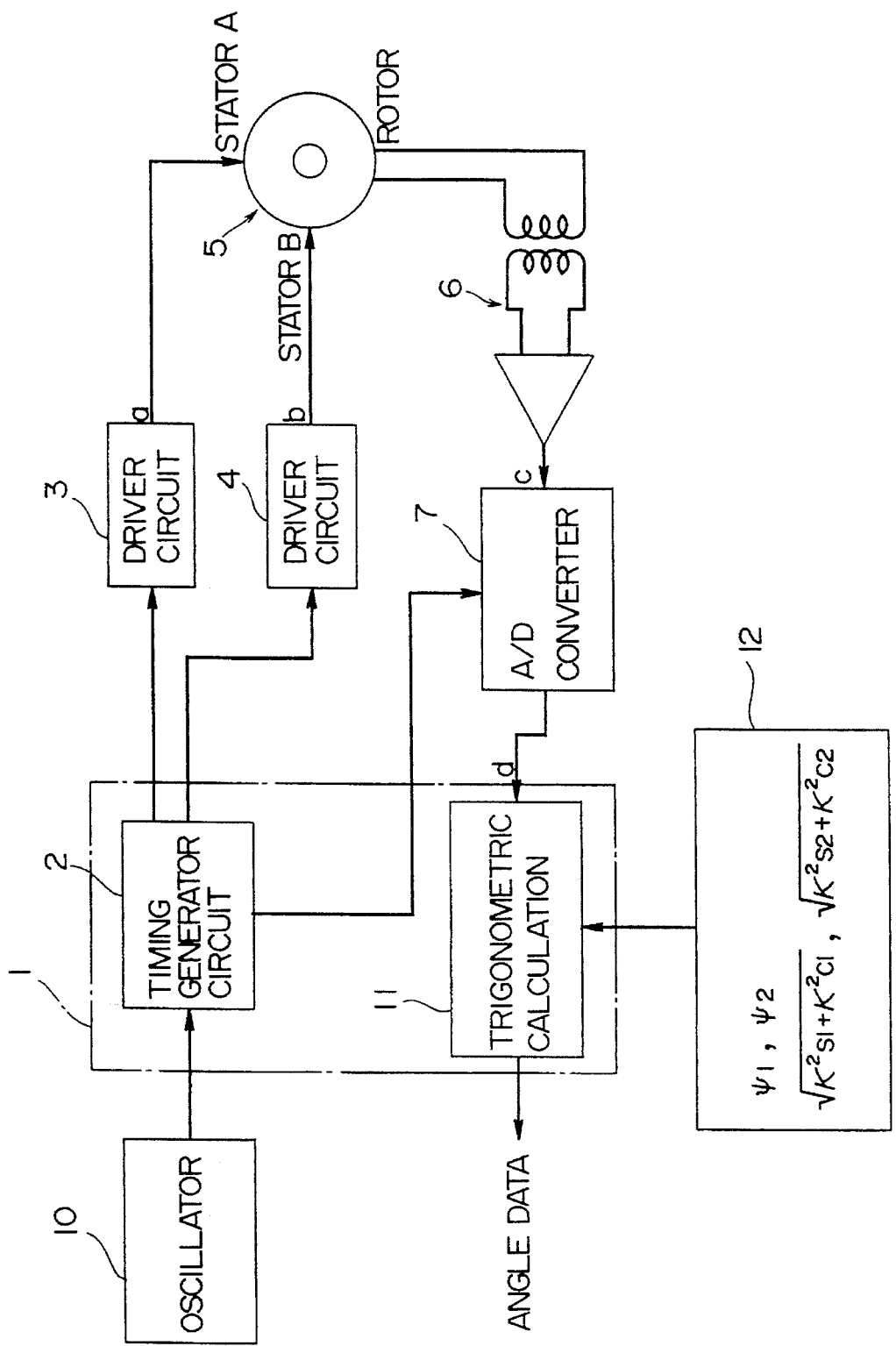
FIGS. 17a and 17b are a block diagram illustrating the organization of an angle of rotation detector employing a trigonometric calculation unit.

FIG. 17 is a block diagram of variation of the fourth embodiment of an angle of rotation detector according to this invention. The elements in the diagram labeled with numbers identical to those in FIG. 15 represent the same circuits. The device in this embodiment differs from that shown in FIG. 15 in the following ways: Instead of memory 19, which stores the table showing the relationship between angles of rotation and the A/D converter outputs, this device has memory 12, which stores $\sqrt{K_{s1}^2 + K_{c1}^2}$, $\sqrt{K_{s2}^2 + K_{cs}^2}$, $\phi_1$ and $\phi_2$ as constants. Instead of comparator 18 in FIGS. 15a and 15b, this device has trigonometric calculation unit 11, which determines angle e by performing a calculation on output E from A/D converter 7 and the constants stored in memory 12.

In the explanation of the device pictured in FIG. 15, it was stated that angle e is obtained by solving the equation $$\Theta = \sin^{-1} \frac{E_s}{\sqrt{K_s^2 + K_c^2}} - \phi$$

Figure 17A:
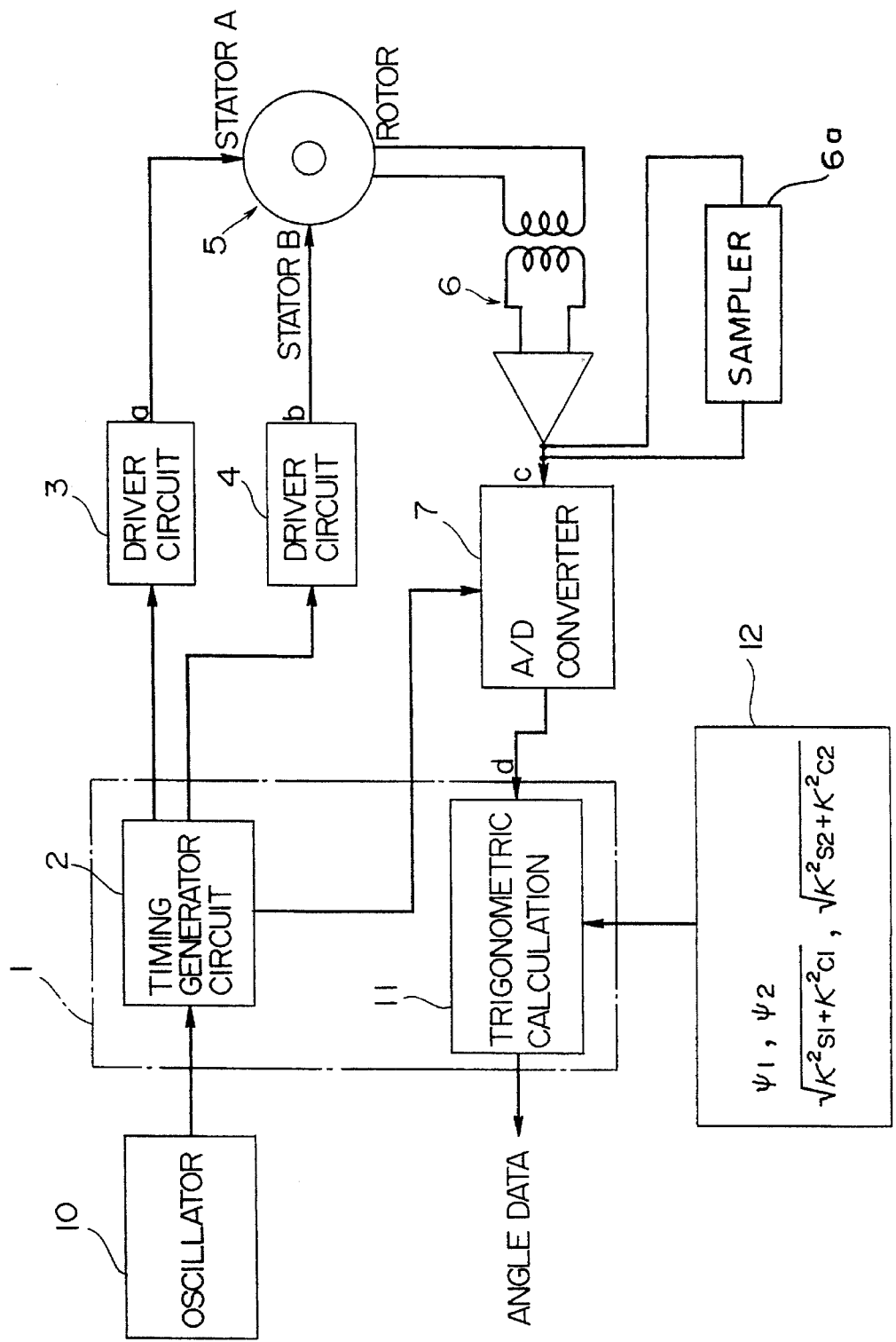

In the device pictured in FIGS. 17a and 17b and described above, values of transfer function (from the amplitude wave to the A/D input) are obtained which represent the amplitude and phase of each high-frequency or harmonic component. These data are stored as constants in memory 12. The output $E_n$ of A/D converter 7 is also used in the above equation to calculate angle $\Theta$.

Figure 18:
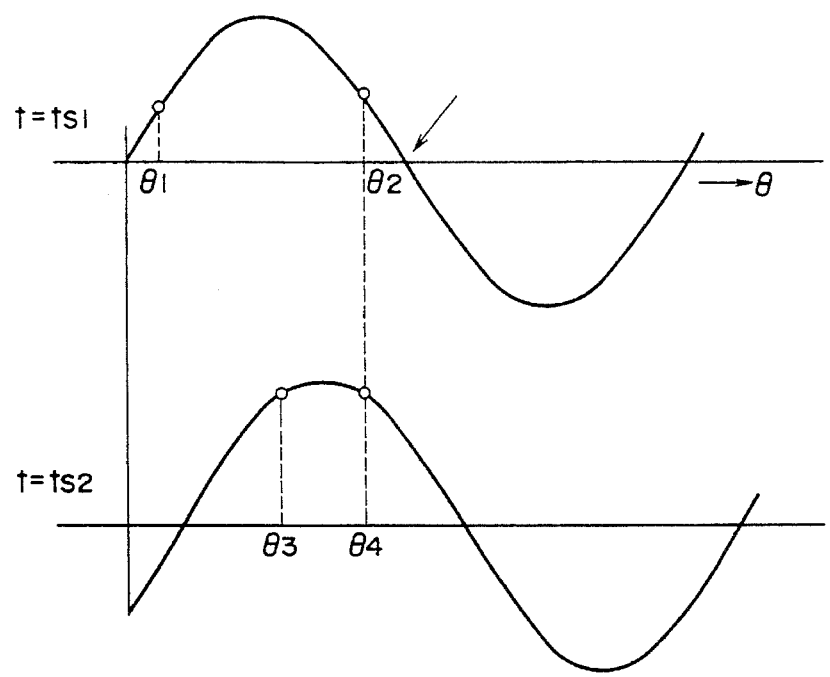
FIG. 18 shows two waveforms which illustrate the principles underlying the angle of rotation detector in FIGS. 17a and 17b.

Few high order components appear in the rotor output, so there is no necessity to calculate them beyond, say, the fifth order harmonic component. Ignoring the high order components beyond the fifth does not pose any practical problems. Because the solution of $$\sin^{-1} \frac{E_s}{\sqrt{K_s^2 + K_c^2}} - \phi$$

is the same at two points in each cycle, the data are sampled at two different points of time relative to the reference point. When these data are compared with the reference values in the table, an unambiguous measurement of the angle can be obtained. In other words, by measuring at the two different points $t_{s1}$ and $t_{s2}$, we can find $\Theta_2$, which is coincident with $\Theta_4$, and thereby determine the value of angle $\Theta$. (see FIG. 18).

With the device in this example, measurement is not affected by harmonic components even though the excitation waves are non-sinusoidal waves, which are easier to generate. The angle of rotation can be determined accurately without the need for a sine wave generator circuit or a low pass filter. As a result, the cost of the device can be held down. Data are sampled at a minimum of two points per cycle, which frees processing time in the calculation device for data display, key input, and comparison of observed data with reference data. Thus the invention allows us to realize an angle of rotation detector with high capabilities and a simple design.

The above descriptions of the preferred embodiments are provided to enable those of ordinary skill in the art to make and use the invention. It will be known that various modifications to these embodiments can be made without departing from the scope of the invention disclosed and claimed herein.

What is claimed is:

1. An angle of rotation detector comprising:

a resolver having a rotor and two stators;

a drive unit connected to supply excitation signals phase-shifted by 90° from each other to said two stators;

an analog to digital converter, connected to receive at an input of said converter an analog output of said rotor, said analog to digital converter having a digital output; and means for calculating a rotational angle of said resolver, said calculating means being connected to receive said digital output, said calculating means being arranged to perform a Fourier transform to compute the phase of a fixed frequency component output by said rotor using an inverse trigonometric relationship.

2. An angle of rotation detector comprising:

a resolver having a rotor and two stators;

a drive unit connected to supply to said stators excitation signals wherein f(T/2+t)= −f(t), where t is time and T is period, Such that said excitation signals contain no even order harmonics, said excitation signals being phase-shifted 90° from each other;

an analog to digital converter, connected to receive at an input of said converter an analog output of said rotor, said analog to digital converter having a digital output; and means for calculating the rotational angle of the resolver, said calculating means receiving said digital output and being arranged to perform a Fourier transform using data from successive half-periods of the waveform of one of said drive signals to compute the phase of a fixed frequency component output by said rotor.

3. An angle of rotation detector comprising:

a resolver with a rotor and two stators;

a drive unit connected to supply to said stators excitation signals phase-shifted by 90° from each other;

a sampler for sampling the output of said rotor each ¼ period of the aforesaid said excitation signals;

an analog to digital converter, connected to receive at an input of said converter an analog output of said rotor from said sampler, said analog to digital converter having a digital output; and means for calculating the rotational angle of the resolver by determining the phase difference between one of said excitation signals and said digital output.

4. The angle of rotation detector recited in claim 3 wherein said calculating means employs straight line interpolation based on two output samples, one of said samples taken before and the other after a zero crossing of said digital output.

5. The angle of rotation detector recited in claim 3 wherein said calculating means calculates the angle of rotation by determining a quotient of two data points sampled successively and then calculating an inverse tangent of said quotient.

6. The angle of rotation detector recited in claim 3 wherein said calculating means further comprises:

a detector for determining whether the outputs of the aforementioned A/D conversion device are above or below a specified value within an amplitude range for the rotor output, and in which of the four quadrants of the cycle the rotor outputs lie; and means for determining the rotational angle of the resolver by calculating the inverse of the sine from the quadrant of the rotor output and a sampled data point.

7. An angle of rotation detector comprising:

a resolver having a rotor and two stators;

a drive unit connected to supply excitation signals phase-shifted by 90° from each other to said two stators;

a sampler connected to sample at least two points of an output waveform of said rotor said points being different from each other and having a fixed time relationship with respect to the waveforms of said excitation signals;

an analog to digital converter, connected to receive at an input of said converter an analog output of said rotor from said sampler, said analog to digital converter having a digital output;

a memory for storing as reference data previously measured relationships between rotor output and angle of rotation; and means for comparing the output of said A/D converter with said reference data in order to determine the resolver's angle of rotation.

8. An angle of rotation detector comprising:

a resolver having a rotor and two stators, a drive unit connected to supply excitation signals phase-shifted by 90° from each other to the said two stators;

a sampler connected to sample an output waveform of said rotor at at least two points different from each other and having a fixed time relationship with respect to the waveforms of said excitation signals;

an analog to digital converter, connected to receive at an input of said converter an analog output of said rotor from said sampler, said analog to digital converter having a digital output;

a memory for storing as constants values which have been previously input for amplitude and phase of harmonic components of said excitation signals contained in the said rotor output; and means for calculating an inverse trigonometric function using said digital output and the said constants in order to determine the rotational angle of the resolver.

* * * * *